(12) United States Patent
D'Amico et al.

(10) Patent No.: US 11,844,346 B2
(45) Date of Patent: Dec. 19, 2023

(54) TERMITE REPELLANT AND WOOD PROTECTOR

(71) Applicants: Biljana Milankovic D'Amico, Metairie, LA (US); Frank D'Amico, Jr., Metairie, LA (US)

(72) Inventors: Biljana Milankovic D'Amico, Metairie, LA (US); Frank D'Amico, Jr., Metairie, LA (US)

( * ) Notice: Subject to any disclaimer, the term of this patent is extended or adjusted under 35 U.S.C. 154(b) by 0 days.

(21) Appl. No.: 17/903,974

(22) Filed: Sep. 6, 2022

(65) Prior Publication Data

US 2023/0276795 A1 Sep. 7, 2023

Related U.S. Application Data

(62) Division of application No. 17/338,658, filed on Jun. 3, 2021, now Pat. No. 11,641,855, which is a division of application No. 16/562,432, filed on Sep. 5, 2019, now abandoned.

(60) Provisional application No. 62/727,299, filed on Sep. 5, 2018.

(30) Foreign Application Priority Data

Apr. 5, 2021 (AU) .................. 2019336760
Apr. 5, 2021 (CA) ..................... 3115388
Apr. 6, 2021 (EP) ..................... 19858185

(51) Int. Cl.
*A01N 27/00* (2006.01)
*A01N 25/24* (2006.01)
*A01N 43/16* (2006.01)
*A01N 55/08* (2006.01)
*A01N 65/36* (2009.01)

(52) U.S. Cl.
CPC ............. *A01N 27/00* (2013.01); *A01N 25/24* (2013.01); *A01N 43/16* (2013.01); *A01N 55/08* (2013.01); *A01N 65/36* (2013.01)

(58) Field of Classification Search
None
See application file for complete search history.

(56) References Cited

U.S. PATENT DOCUMENTS

| | | |
|---|---|---|
| 8,747,908 B2 | 6/2014 | Leach et al. |
| 9,775,350 B2 | 10/2017 | Zhang et al. |
| 9,999,218 B2 | 6/2018 | Manhas et al. |
| 9,999,227 B2 | 6/2018 | Manhas et al. |
| 2003/0104135 A1 | 6/2003 | Grantham |
| 2005/0217537 A1 | 10/2005 | Knipe |
| 2006/0134040 A1 | 6/2006 | Glassel et al. |
| 2006/0147632 A1 | 7/2006 | Zhang et al. |
| 2010/0144888 A1 | 6/2010 | Bessette |
| 2012/0121809 A1 | 5/2012 | Vuozzo |
| 2014/0220164 A1 | 8/2014 | Manhas et al. |
| 2017/0360042 A1 | 12/2017 | Zhang et al. |

*Primary Examiner* — Celeste A Roney
(74) *Attorney, Agent, or Firm* — Norton IP Law Firm LLC; Taylor M. Norton

(57) ABSTRACT

Termicidal compositions to control insects consisting of cold pressed orange oil with a high concentration D-Limonene of at least 80% and consisting of an acrylic lacquer, for protective repellents against termite infestation, are provided. The preferred termicidal compositions to control insects consist of cold pressed orange oil with a high concentration D-Limonene of at least 80%, an acrylic lacquer, boric acid, and water.

12 Claims, 10 Drawing Sheets

TERMITE REPELLANT AND WOOD PROTECTOR

BACKGROUND OF THE INVENTION

Cross-Reference to Related Applications

This application is a divisional continuation of and claims the benefit of priority of co-pending U.S. patent application Ser. No. 17/338,658, filed Jun. 3, 2021, which is a divisional continuation of and claims the benefit of priority of U.S. Nonprovisional patent application Ser. No. 16/562,432, filed Sep. 5, 2019, which claims the benefit of priority of U.S. Provisional Application No. 62/727,299, filed Sep. 5, 2018, the full disclosures of which are all hereby incorporated by reference in their entireties.

Field of the Invention

The present invention relates to compositions to treat wood. More particularly, the present invention relates to compositions and methods for treating wood to control insects and more particularly, kill termites, while deterring and preventing termite infestations.

Description of the Related Art

A pest is an organism which is detrimental to humans or human concerns. Pests include insects, plant pathogens, weeds, molluscs, birds, mammals, fish, nematodes (roundworms) and microbes.

Typically, pests are classified into insects, mites, nematodes and gastropods. Pesticides are substances or mixture of substances intended for preventing, destroying, repelling or mitigating any pest. A pesticide may be a chemical agent, a biological agent (such as a virus or bacterium), an antimicrobial, a disinfectant or a device used against any pest.

Pesticides are categorized into four main substituent chemicals: herbicides, fungicides, insecticides and bactericides. Pesticides can be classified by target organism, chemical structure and physical state. Pesticides can also be classed as inorganic, synthetic, or biological (bio-pesticide). Bio-pesticides include microbial pesticides and biochemical pesticides. These include pyrethroids, rotenoids and nicotinoids. Pesticides can also be classified based upon their biological mechanism function or application method. Most pesticides work by poisoning the pests.

An insecticide is a pesticide used against insects. They include ovicides and larvicides, used against the eggs and larvae of insects respectively. Insecticides are classified in several different ways. Typically, they are classified as systemic insecticides, contact insecticides, natural insecticides, plant-incorporated protectants (PIPS), inorganic insecticides and organic insecticides. The commonly known insecticides include: i) organochlorides such as DDT, aldrin, chlordane, chlordecone, heptachlor, methoxychlor, pentachlorophenol and the like; ii) organophosphates such as acephate, azinphos-methyl, bensulide, chlorethoxyfos, chlorpyrifos, diazinon, dimethoate, disulfoton, ethoprop, fenamiphos, parathion, trichlorfon and the like; iii) pyrethroids such as allethrin, bifenthrin, cyhalothrin, lambda-cyhalothrin, cypermethrin, cyfluthrin, prallethrin, transfluthrin and the like, iv) carbamates such as aldicarb, bendiocarb, carbofuran, carbaryl, dioxacarb, fenobucarb, fenoxycarb, isoprocarb, methomyl and the like.

Commercially available insecticides, including those available for home use, commonly comprise active ingredients or poisons which are not only toxic to the target insect pests, but, if used in relatively confined environments and delivered as aerosol sprays, can be present in sufficient concentration to also be toxic to humans and household pets. Various undesirable side effects may include immediate or delayed neurotoxic reactions, and/or suffocation. Even the noxious odor of such materials can cause headaches or upset stomachs in some individuals. These adverse side effects are exacerbated when such compositions come in contact with persons of increased sensitivity, or persons of small body mass such as children or babies.

For some time, efforts have been made to develop insecticidal compositions, particularly those intended for residential use, which are effective in killing the targeted insect pests completely and quickly, but non-toxic to humans and pets. The Environmental Protection Agency (EPA) regulates the use of potentially toxic ingre-dients in pesticidal compositions under the Federal Insecti-cide, Fungicide and Rodenticide Act (FIFRA). Certain mate-rials considered to be either active or inert materials by the EPA have been deregulated or otherwise identified as accept-able safe substances under FIFRA offering minimum risk in normal use. Other materials are currently undergoing inves-tigation and may be deregulated in due course. Consumers generally consider deregulated substances non-poisonous or non-toxic. Thus, the term non-toxic or non-poisonous as used herein is intended to convey a compound or composition that, while highly effective in killing targeted insect pests, is safe to use around humans, particularly small children, and pets.

The search for a new repellent or termiticide is difficult because studies have shown that termites show unexpected sensitivity to chemicals, sensitivity that differs from that of other insects. For example, phenoxyethanol has been shown to be a trail-following substance; and naphthalene, a toxicant for most insects, was found to be used as fumigant by termites for their nests at concentrations that would kill fire ants, as disclosed in U.S. Pat. No. 5,874,097. That and other conventional compositions are disclosed in the following U.S. Patents and U.S. Patent Application Publications, which are incorporated herein by reference:

| U.S. Pat. No. | Inventor |
| --- | --- |
| 8,747,908 | Leach, et. al. |
| 9,775,350 | Zhang, et. al. |
| 9,999,218 | Manhas, et. al. |
| 9,999,227 | Manhas, et. al. |

The following U.S. Publication Nos. are incorporated herein by reference:

| U.S. patent application Pub. No. | Inventor |
| --- | --- |
| 2003/0104135 | Grantham, et. al. |
| 2005/0217537 | Knipe |
| 2006/0134040 | Glassel, et. al. |
| 2006/0147632 | Zhang, et. al. |
| 2010/0144888 | Bessette |
| 2012/0121809 | Vuozzo |
| 2014/0220164 | Manhas, et. al. |
| 2017/0360042 | Zhang, et. al. |

While such conventional compositions and methods may be partly suitable for the particular purpose employed, they would not be as suitable for the purposes of the present invention as disclosed herein.

Accordingly, there is a need for simple, environmentally friendly, non-toxic compositions and methods that can efficiently and effectively treat wood to control insects and more particularly, to repel termites, kill termites, and/or prevent or mitigate termite infestations.

As disclosed in this application, the inventors have discovered novel and unique compositions and methods for efficient and effective wood treatment to control insects and more particularly to repel termites from wood, exterminate termites, as well as deter, prevent and/or mitigate termite infestations, which exhibit superlative properties without being dependent on highly toxic, expensive or complex components.

Embodiments of the present invention provide for compositions and methods disclosed herein and as defined in the annexed claims which provide for improved wood treatment features in order to efficiently, simply, and effectively serve as insect control and more particularly, as a termite infestation deterrent, preventer, and/or exterminator.

SUMMARY OF THE INVENTION

It is one prospect of the present invention to provide one or more novel compositions and methods of simple but effective formulation which can be applied to many environments to efficiently and effectively control insects, and in particular exterminate, deter, prevent and/or mitigate termite infestations.

The following presents a simplified summary of the present disclosure in a simplified form as a prelude to the more detailed description that is presented herein.

Therefore, in accordance with embodiments of the invention, there is provided a composition for a protective barrier against termite infestation, said barrier composition comprising an effective amount of acrylic lacquer and cold pressed orange oil, wherein said cold pressed orange oil has a D-Limonene concentration of at least 80%, and a construction wood, wherein said construction wood without said acrylic lacquer and cold pressed orange oil composition is susceptible to termite infestation, wherein said composition is free of formaldehyde and wherein the treated construction wood repels or kills termites substantially more than does an otherwise identical construction wood that has not been treated with the compound.

The composition preferably includes cold pressed orange oil having a D-Limonene concentration of at least 90%. More preferably, the composition includes cold pressed orange oil having a D-Limonene concentration of at least 95%.

In another embodiment, the composition has an acrylic lacquer including a mixture of a modified acrylic emulsion copolymer component, a dipropylene methyl ether component, a polysiloxane polymer component, an amine solution component, and a water component.

In accordance with another embodiment of the invention, there is provided a method for protecting a material from termite infestation. The method includes treating the material with a composition comprising an effective amount of D-Limonene, wherein the composition is free of formaldehyde, wherein the material without said treatment is susceptible to termite infestation, and wherein the treated material repels or kills termites substantially more than does an otherwise identical material that has not been treated with the D-Limonene. In embodiments disclosed herein, the treated material repels termites, and in further embodiments, the treated material kills termites.

In accordance with yet another embodiment, there is provided a composition to control insects consisting of 25% by weight of cold pressed orange oil containing a D-Limonene concentration of at least 80%, and 75% by weight of an acrylic lacquer. Preferably, the 25% by weight cold pressed orange oil contains a D-Limonene concentration of at least 90%. More preferably, the 25% by weight cold pressed orange oil contains a D-Limonene concentration of at least 95%. In yet another embodiment, there is provided a composition to control insects consisting of 20% by weight of cold pressed orange oil containing a D-Limonene concentration of at least 80%, and 80% by weight of an acrylic lacquer. In such embodiment, the 20% by weight cold pressed orange oil preferably contains a D-Limonene concentration of at least 90%. More preferably, the 20% by weight cold pressed orange oil contains a D-Limonene concentration of at least 95%. In a preferred embodiment, there is provided a composition to control insects consisting of 20% by weight of cold pressed orange oil containing a D-Limonene concentration of at least 80%, 50% by weight of an acrylic lacquer, 20% by weight of boric acid, and 10% by weight of water. In such preferred embodiment, the 20% by weight cold pressed orange oil contains a D-Limonene concentration of at least 90%, and more preferably, the 20% by weight cold pressed orange oil contains a D-Limonene concentration of at least 95%. In yet another preferred embodiment, there is provided a composition to control insects consisting of 20% by weight of cold pressed orange oil containing a D-Limonene concentration of at least 80%; 50% by weight of an acrylic lacquer, wherein said 50% by weight of the acrylic lacquer consists of 45% by weight of a modified acrylic emulsion copolymer, 3% by weight of dipropylene glycol methyl ether, 1% by weight polysiloxane polymer, and 2% by weight amine solution; 20% by weight of boric acid; and 10% by weight of water. In such preferred embodiment, the 20% by weight cold pressed orange oil contains a D-Limonene concentration of at least 90%, and more preferably, the 20% by weight cold pressed orange oil contains a D-Limonene concentration of at least 95%.

In yet another embodiment, an insect control composition is provided having: 5%-35% by weight cold pressed orange oil containing a concentration of at least 80% D-Limonene; 20%-50% by weight modified acrylic emulsion copolymer; 1%-10% by weight dipropylene glycol methyl ether; 1%-5% by weight polysiloxane polymer; 1%-5% by weight amine solution; and 20%-60% by weight water. Preferably, the cold pressed orange oil comprises a D-Limonene concentration of at least 90%. More preferably, the cold pressed orange oil of the insect control composition has a D-Limonene concentration of at least 95%. In yet a most preferred embodiment, an insect control composition is provided consisting of: 5%-35% by weight cold pressed orange oil containing a concentration of at least 80% D-Limonene (and preferably a D-Limonene concentration of at least 95%), 20%-50% by weight modified acrylic emulsion copolymer, 1%-10% by weight dipropylene glycol methyl ether, 1%-5% by weight polysiloxane polymer, 1%-5% by weight amine solution, and 20%-60% by weight water.

In one embodiment, the insect control composition also includes at least one food grade preservative in a range of approximately 0.1%-1% by weight. Preferably, the at least one food grade preservative is sodium benzoate.

In a preferred embodiment, the disclosed insect control composition includes pure boric acid in powder form in a range of 1%-30% by weight. Surprisingly, the insect control composition includes pure boric acid powder in a range of 1%-30% by weight, and the composition containing the pure boric acid has a lower viscosity than said composition without pure boric acid powder, through embodiments of the invention.

In another embodiment, insect control composition includes pure boric acid in liquid form in a range of 1%-30% by weight.

In accordance with additional embodiments of the invention, an insect control composition is presented. The insect control composition preferably includes 5%-30% by weight of D-Limonene, 1%-20% by weight cold pressed castor oil as a non-toxic emulsifying agent, 20%-50% by weight modified acrylic emulsion copolymer, 1%-10% by weight dipropylene glycol methyl ether, 1%-5% by weight polysiloxane polymer, 1%-5% by weight amine solution, and 20%-60% by weight water. In a preferred embodiment, the insect control composition consists of 5%-30% by weight of D-Limonene, 1%-20% by weight cold pressed castor oil as a non-toxic emulsifying agent, 20%-50% by weight modified acrylic emulsion copolymer, 1%-10% by weight dipropylene glycol methyl ether, 1%-5% by weight polysiloxane polymer, 1%-5% by weight amine solution, and 20%-60% by weight water.

In one embodiment the insect control composition further includes at least one food grade preservative in a range of approximately 0.1%-1% by weight. In another embodiment, the insect control composition further includes pure boric acid in a range of 1%-30% by weight.

In accordance with embodiments of the invention disclosed herein, a termite repellent wood preservative lacquer is provided. The termite repellent wood preservative lacquer preferably includes 20%-35% by weight of cold pressed orange oil containing a D-Limonene concentration of at least 80%, 5%-15% by weight of water, 45%-55% by weight of modified acrylic emulsion copolymer, 3%-9% by weight of dipropylene glycol methyl ether, 1%-5% by weight of polysiloxane polymer, and 2%-8% by weight of amine solution.

In one embodiment, the termite repellent wood preservative lacquer further includes 0.5%-2% by weight of terpene hydrocarbons, and 0.5%-1% by weight of oxygenated terpenes.

In another embodiment, the cold pressed orange oil comprises a D-Limonene concentration of at least 90%.

In yet another embodiment, the cold pressed orange oil comprises a D-Limonene concentration of at least 95%.

In one embodiment the termite repellent wood preservative lacquer further includes pure boric acid in a range of 1%-30% by weight.

In accordance with embodiments of the invention a termite resistant wood preservative composition for treating lumber products to control insects is presented. The termite resistant wood preservative composition for treating lumber products to control insects consists of 25% by weight of cold pressed orange oil having a concentration of at least 80% D-Limonene and 75% by weight of an acrylic lacquer.

In one embodiment, the 25% by weight cold pressed orange oil contains a D-Limonene concentration of at least 90%.

In another embodiment the 25% by weight cold pressed orange oil contains a D-Limonene concentration of at least 95%.

In accordance with embodiments of the invention there is provided a method for repelling and killing termites, which includes applying to a wooden material where control of termites is desired, a pesticidally-effective amount of a composition comprising an active ingredient and a pesticidally-acceptable carrier, wherein the active ingredient is cold pressed orange oil containing a D-Limonene concentration of at least 80%, wherein the pesticidally-acceptable carrier is an acrylic lacquer.

In one embodiment, the cold pressed orange oil contains a D-Limonene concentration of at least 90%

In another embodiment, the cold pressed orange oil contains a D-Limonene concentration of at least 95%.

In accordance with embodiments of the invention there is provided a method for protecting cellulosic materials from termite infestation comprising a step of applying to the cellulosic material a solution comprising an effective amount of cold pressed orange oil containing a D-Limonene concentration of at least 80%.

In one embodiment, the method further includes a step of drying the cellulosic material in a dryer adapted for lumber and a step of applying to the cellulosic material a composition comprising approximately 25% by weight a cold pressed orange oil component having a concentration of at least 80% D-Limonene, and said composition comprising approximately 75% by weight an acrylic lacquer component, said acrylic lacquer component comprising approximately 45% by weight modified acrylic emulsion copolymer, at least 40% by weight water, at least 5% by weight dipropylene glycol methyl ether, at least less than 5% by weight polysiloxane polymer, and at least less than 5% by weight amine solution.

In another embodiment, the solution is applied to the cellulosic material by spraying.

In yet another embodiment, the solution is applied by dipping the cellulosic material into the solution.

In another embodiment, the solution is applied to the cellulosic material by a pressure treatment process.

In one embodiment, the cellulosic material is selected from the group consisting of green lumber, dried lumber, and pressure treated lumber.

In another embodiment, the cellulosic products further define cellulosic products selected from the group consisting of green lumber, dried lumber, pressure treated lumber, seeds, grains, legumes, fruits, vegetables, and plants.

In yet another embodiment, the cellulosic material is wood and said process further includes applying an additional wood preservative.

In one embodiment, the cellulosic material is wood and said process further includes applying an additional wood preservative selected from the group consisting of ACQ, Borates, Copper azole, Copper naphthenate, Copper-HDO (Bis-(Ncyclohexyldia/eniumdioxy-copper)) and Polymeric betaine.

In a preferred embodiment, a composition for repelling termites and protecting wood is present. The preferred composition includes approximately 25% by weight cold pressed orange oil component, having a concentration of at least 90% D-Limonene, and approximately 75% by weight acrylic lacquer component, with the acrylic lacquer component comprising approximately 45% by weight modified acrylic emulsion copolymer, at least 40% by weight water, at least 5% by weight dipropylene glycol methyl ether, at least less than 5% by weight polysiloxane polymer, and at least less than 5% by weight amine solution.

In one embodiment, a composition for repelling termites and protecting wood is present. The preferred composition includes approximately 25% by weight cold pressed orange oil component, having a concentration of at least 80% D-Limonene, and approximately 75% by weight acrylic lacquer component, with the acrylic lacquer component comprising modified acrylic emulsion copolymer in a range of approximately 45%-50% by weight, water in a range of 40%-45% by weight, dipropylene glycol methyl ether in a range of 5%-10% by weight, polysiloxane polymer in a range of 1%-5% by weight, and amine solution in a range of 1%-5% by weight.

In another embodiment, the composition includes an acrylic lacquer having a mixture of a non-toxic emulsifying agent component, a modified acrylic emulsion copolymer component, a dipropylene methyl ether component, a polysiloxane polymer component, an amine solution component, and a water component.

In another embodiment of the invention, a method for protecting a material from termite infestation is provided. Preferably, the method includes treating the material with a composition comprising an effective amount of a composition of acrylic lacquer and cold pressed orange oil having a D-Limonene concentration of at least 80%, wherein the composition is free of formaldehyde, wherein said material without said treatment is susceptible to termite infestation, and wherein the treated material repels or kills termites substantially more than does an otherwise identical material that has not been treated with the composition. As disclosed herein, the treated material repels termites. Moreover, as further disclosed herein, the treated material kills termites.

Therefore, in accordance with embodiments of the invention, there is provided a composition, preferably comprising about approximately 25% cold pressed orange oil having a D-Limonene concentration of at least 80%, and approximately 75% acrylic lacquer.

In one preferred embodiment, there is provided a composition to control insects, such as termite infestations, where the composition comprises a mixture component having 80%-96% by weight of D-Limonene and 4%-20% by weight of a non-toxic emulsifying agent, such as, for example, Alkamuls® EL-620 castor oil. In such embodiment, the composition further comprises an acrylic lacquer component comprising approximately 20% to 40% by weight of modified acrylic emulsion copolymer, approximately 1% to 10% by weight of dipropylene glycol methyl ether, 1% to 5% by weight of Polysiloxane Polymer, 1% to 5% by weight of Amine solution, and approximately 20% to 60% by weight of water. The composition preferably further includes, but does not require, at least one food-grade preservative, such as, for example, sodium benzoate in a range of approximately 0.1% to 1% by weight.

In accordance with embodiments of the invention, there is provided another preferred composition to control insects, such as termites, comprising approximately 10% to approximately 30% by weight of D-Limonene, approximately 1% to approximately 20% by weight of a non-toxic emulsifying agent, such as, for example, Alkamuls® EL 620 castor oil, approximately 20% to 60% by weight of modified acrylic emulsion copolymer, approximately 1% to 10% by weight of dipropylene glycol methyl ether, 1% to 5% by weight of Polysiloxane Polymer, 1% to 5% by weight of Amine solution, and approximately 10% to 30% by weight of water. The composition preferably further includes, but does not require, at least one food-grade preservative, such as, for example, sodium benzoate in a range of approximately 0.1% to 1% by weight.

In one embodiment, the composition preferably further includes 1% to 5% by weight of terpene hydrocarbons and 1% to 5% by weight of oxygenated terpenes.

In a preferred embodiment, a composition is provided comprising a 25% by weight cold pressed orange oil solution and 75% by weight acrylic Lacquer solution, which includes approximately 20% by weight of D-Limonene, approximately 2% by weight of Terpene Hydrocarbons, approximately 1% by weight of Oxygenated Terpenes, approximately 3% by weight of cold pressed Castor Oil, approximately 10% by weight of water, approximately 50% by weight of modified acrylic emulsion copolymer, approximately 6% by weight of dipropylene glycol methyl ether, approximately 3% by weight of polysiloxane polymer, and approximately 5% by weight of amine solution.

In accordance with embodiments of the invention, there is provided a preferred method of treating wood in interior and exterior settings with an insect repelling composition. In such embodiment, before applying the insect repelling composition to wood, a user should mix the composition thoroughly, preferably by gently stirring the composition, or by rolling a container housing said composition, in an effort to avoid air bubbles. Preferably, the composition should be stirred thoroughly for approximately 20 minutes prior to application. The preferred method comprises applying said insect control composition to at least one wood surface by painting said composition onto the at least one wood surface, for example, with a quality nylon brush or a pad applicator. In such preferred embodiment, the user uses the brush or pad to apply liberal coats of the composition to the at least one wood surface, while avoiding over brushing and keeping the brush or pad saturated with the composition. The user applies a first coat of the composition to the at least one wood surface to a point of surface saturation. Preferably, the method includes waiting approximately 6-24 hours to allow the composition of the first coat to completely dry. Once the composition applied to the at least one wood surface is completely dry, the user applies a second coat of the composition to the at least one wood surface to a point of surface saturation. Preferably, the method further includes waiting an additional approximately 6-24 hours to allow the composition of the second coat to completely dry.

In another preferred embodiment, there is provided a method of treating wood in interior and exterior settings with an insect repelling composition. In such preferred embodiment, before applying the composition to wood, a user should mix the composition thoroughly by gently stirring or rolling a container housing said composition to avoid air bubbles. Preferably, the composition should be stirred thoroughly approximately every 20 minutes prior to application. The preferred method comprises applying said insect control composition to at least one wood surface by spraying the composition onto said wood surface with an unheated spray applicator. The user applies a first coat of the composition to the at least one wood surface to a point of surface saturation. The method includes waiting approximately 6-24 hours to allow the composition of the first coat to completely dry. Once the composition applied to the at least one wood surface is completely dry, the user applies a second coat of the composition to the at least one wood surface to a point of surface saturation. The method preferably further includes waiting an additional approximately 6-24 hours to allow the composition of the second coat to completely dry.

In yet another preferred embodiment, there is provided a method of pre-treating wood in interior and exterior settings with an insect repelling composition. In such preferred embodiment, before pre-treating the wood with the composition, a user should mix the composition thoroughly by gently stirring or rolling a container housing said composition to avoid air bubbles. In such preferred embodiment, the method includes applying a first coat of the insect repelling composition to pretreat a piece of wood by soaking the piece of wood with said insect repelling composition to a point of wood saturation. A user pre-treating the piece of wood removes the piece of wood at the point of wood saturation from the container housing the composition. The method includes allowing the piece of wood at the point of wood saturation with the composition to dry for approximately 8-24 hours before handling the piece of wood.

In one embodiment, the method further includes applying a second coat of the insect repelling composition to the piece of wood after the piece of wood at the point of wood saturation with the composition has dried for approximately 8-24 hours by soaking said piece of wood in the composition to the point of wood saturation and allowing the piece of wood to dry for an additional approximately 8-24 hours before handling said piece of wood.

BRIEF DESCRIPTION OF THE DRAWINGS

Illustrative embodiments of the present invention are described herein with reference to the accompanying drawings, in which like numerals throughout the figures identify substantially similar components, in which.

DETAILED DESCRIPTION

Figure 1:
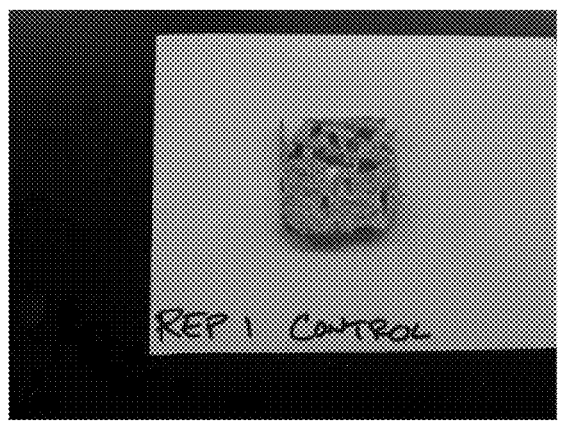
FIG. 1. is a photograph showing a series of untreated wood blocks which were used as testing controls to evaluate the compositions of the present invention.
Figure 1:
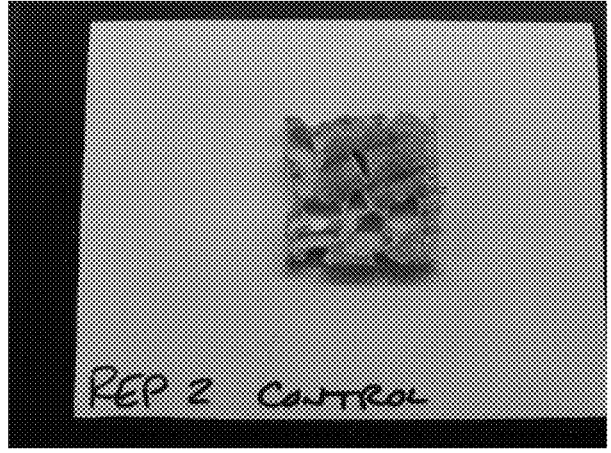
Figure 1:
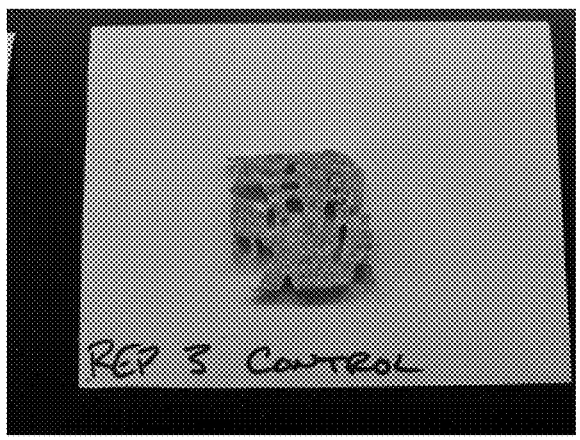
Figure 1:
Figure 1:

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

The advantages and significant benefits of the present invention include high solids, more film build, better flow, higher luster, when compared to conventional lacquers in performance without the toxicity. The present invention can be safely used by chemically sensitive users and has a mild odor content similar to citrus scent. The present invention fights indoor air pollution by sealing in off gassing and containing a very low volatile organic compound (VOC) content, which meets or exceeds all federal and state air quality regulations, including California's. Unlike many commercially available products the composition of the present invention contains no formaldehyde. The evaporation rate of the compositions of the present invention are slower than ether and have a vapor density that is heavier than air.

Therefore, in accordance with preferred embodiments of the invention there are provided insect repelling compositions of non-toxic wood preservatives that can be applied directly to the wood of a home's interior or exterior that are safe for pets and humans. The insect repelling compositions are able to deter, kill, and/or prevent insects from accessing wood which may serve as a food source for insects that come into contact with these compositions. According to inventors' research, the termite species *termites subterranean* excretes an alarm pheromone when exposed to a compound sourced from citrus fruit peels known as D-Limonene ($C_{10}H_{16}$). The d-isomer of limonene, a monoterpene and cycloalkene, occurs commonly in nature as the fragrance of oranges. The alarm pheromone excretion of termites is a natural defense mechanism of *termites subterranean*. Accordingly, when subterranean soldier termites detect danger in a location, these termites excrete the alarm pheromone to warn other termites of the danger, thereby, directing the other termites to avoid that location. When wood is treated with D-Limonene, the compound creates a zone of danger or discomfort perceived by wood boring insects, signifying to these insects that the zone is not inherently safe. The compositions of the present invention are believed to have long lasting effects, which deter and/or kill insects that come into contact with it, affecting a wide range of wood boring and eating insects, including termites, carpenter ants, and carpenter bees. The compositions of the present invention cause termite death, which result from destruction of the digestive and respiratory systems of termites. These compositions of the present invention are effective for many years and also assist with sealing outgassing.

Therefore, in accordance with embodiments of the invention there is provided a non-toxic insect control composition for treatment of a wood surface in interior and exterior settings. The composition of the present invention is preferably a clear, hard and durable, water-based acrylic compound. The composition includes D-Limonene, in a range of at least 5% to approximately 30% by weight, a non-toxic emulsifying agent, in a range of at least 1% to approximately 20% by weight, water in a range of at least 20% by weight to approximately 60% by weight of water, a modified acrylic emulsion copolymer in a range of at least 20% by weight to approximately 45% by weight, dipropylene glycol methyl ether in a range of at least 1% by weight to approximately 10% by weight, Polysiloxane Polymer in a range of at least 1% by weight to approximately 5% by weight, and an Amine solution in a range of at least 1% by weight to approximately 5% by weight. The D-Limonene can be derived from a variety of citrus fruits and other plants and is commercially available under the name Cold Pressed Orange Oil, for example. The non-toxic emulsifying agent can be, for example, Alkamuls® EL620. The composition preferably includes each of the above ingredients, though including the D-Limonene is highly preferred. D-Limonene, otherwise known as orange limonene or 1-methyl-4-(1 methylethenyl) cyclohexene, or 4-ispropenyl-1-methyl cyclohexene, has a chemical formula of $C_{10}H_{16}$, a molecular weight of 136.2, and contains 88.1% C and 11.8% H by weight. It occurs in various ethereal oils, particularly in oils of lemon, orange, lime, grapefruit and bergamot. D-Limonene can be cold pressed from citrus peels or obtained from steam extraction of citrus peels of, for example, orange, lemon, grapefruit, lime, and bergamot. Some extractions from citrus peels contain as high as 95% D-Limonene. Distillation of the oils produces technical grades of D-Limonene of higher purity from approximately 95% to approximately 96%.

In one embodiment, the non-toxic insect control composition preferably includes at least one food-grade preservative, such as sodium benzoate in a range of at least 0.1% to approximately 1% by weight.

In an exemplary embodiment of the present invention, a composition is provided comprising approximately 25% by weight cold pressed orange oil component, having a concentration of at least 90% D-Limonene, and approximately 75% by weight acrylic lacquer component, with the acrylic lacquer component comprising approximately 45% by weight modified acrylic emulsion copolymer, at least 40% by weight water, at least 5% by weight dipropylene glycol methyl ether, at least less than 5% by weight polysiloxane polymer, and at least less than 5% by weight amine solution.

The modified acrylic emulsion copolymer, dipropylene glycol methyl ether, polysiloxane, amine solution and water are mixed first, then Alkamuls® El-620, water, and D-Limonene are mixed next. Once mixed, the composition remains homogenous for at least 180 days. When separation occurs, simple stirring is sufficient to cause the composition to become homogenous again. The D-Limonene is sourced from, for example, cold pressed orange oil preferably containing over 95% D-Limonene concentration, which is sold, for example, under the brand Medina®. The modified acrylic emulsion copolymer is sold, for example, under the brands Gellner Industrial, Golden Artist Colors®, and Holbein®. The dipropylene glycol methyl ether is sold, for example, under the brands Quality Chemical™, TCI America, DOW Chemical Company. The polysiloxane polymer is sold, for example, under the brands Golden Artist Colors®, Holbein®, Haisun®. The amine solution is sold, for example, by Amine Solutions Inc., Grainger Inc., Salt-X®. The 25% and 75% solutions of the composition can be applied to unpainted raw wood. In such embodiments of the invention, the composition dries completely in approximately 4 hours in dry environments and a second coat is then applied. Once the second coat dries the painted wood retains the aromatic citrus smell for at least 6 months.

Another exemplary embodiment of the present invention includes a composition having 30% Cold Pressed Orange Oil and 70% Acrylic Lacquer solutions. In such exemplary embodiment, the Cold Pressed Orange Oil component of the composition includes at least 80% by weight of D-Limonene, sold, for example, under the Home & Garden® brand from Green Gobbler™ Company. In such embodiment, the Acrylic Lacquer component includes at least 10% by weight of water; at least 50% by weight of modified acrylic emulsion copolymer, sold, for example, under the brands Gellner Industrial, Golden Artist Colors®, and Holbein®, at least 6% by weight of dipropylene glycol methyl ether, sold, for example, under the brands Quality Chemical™, TCI America, DOW Chemical Company, at least 3% by weight of polysiloxane polymer, sold, for example, under the brands Golden Artist Colors®, Holbein®, Haisun®, and at least 5% by weight of amine solution, sold, for example, by Amine Solutions Inc., Grainger Inc., Salt-X®. The modified acrylic emulsion copolymer, dipropylene glycol methyl ether, polysiloxane, amine solution and water are mixed first, then Alkamuls® El 620, water, and D-Limonene are mixed. Once mixed, the composition remains homogenous for at least 180 days. When separation occurs, simple stirring is sufficient to cause the composition to become homogenous again.

In exemplary embodiments of the present invention, a composition includes 30% and 50% solutions. The 30% solution of the composition includes approximately 4% by weight of D-Limonene, approximately 3% by weight of Alkamuls® El 620, known as cold pressed Castor Oil, approximately 20% by weight of water, approximately 60% by weight of modified acrylic emulsion copolymer, approximately 4% by weight of dipropylene glycol methyl ether, approximately 4% by weight of polysiloxane polymer, and approximately 5% by weight of amine solution.

In such exemplary embodiment, the modified acrylic emulsion copolymer, dipropylene glycol methyl ether, polysiloxane, amine solution and water are mixed first, then Alkamuls® El 620, water, and D-Limonene are mixed. Once mixed, the composition remains homogenous for at least 30 days. When separation occurs, simple stirring is sufficient to cause the composition to become homogenous again.

D-limonene is a compound sourced from the peel of citrus fruits, including, for example, oranges, mandarins, limes, and grapefruit. In preferred embodiments of the invention, the D-Limonene is sourced from cold pressed orange oil.

Preferably, the cold pressed orange oil component contains a D-Limonene concentration of preferably at least 80%, and more preferably of at least 95%. The preferred cold pressed orange oil is sold, for example, under the brands Home & Garden® or Medina®.

The Castor Oil is sold under the brands Alkamuls® EL-620 brand emulsifier, UpNature®, or Essential Depot®. One skilled in the art can appreciate that the castor oil can be organic.

The preferred modified acrylic emulsion copolymer is sold, for example, under the brands Gellner Industrial, Golden Artist Colors®, and Holbein®. Preferably, the dipropylene glycol methyl ether is sold, for example, under the brands Quality Chemical™, TCI America, DOW Chemical Company. Preferably, the polysiloxane polymer is sold, for example, under the brands Golden Artist Colors®, Holbein®, Haisun®. The amine solution is sold, for example, by Amine Solutions Inc., Grainger Inc., Salt-X®.

In one embodiment, the composition includes approximately 26% by weight of D-Limonene, approximately 5% by weight of Alkamuls® EL620, approximately 14% by weight of water; approximately 45% by weight of modified acrylic emulsion copolymer, approximately 5% by weight of dipropylene glycol methyl ether, approximately 2% by weight of polysiloxane polymer; and approximately 3% by weight of amine solution. The modified acrylic emulsion copolymer, dipropylene glycol methyl ether, polysiloxane, amine solution and water are mixed first, then Alkamuls® El 620, water, and D-Limonene are mixed. The compositions combine without complications and stay homogeneous over time.

In such exemplary embodiment, the D-Limonene can be sourced from cold pressed orange oil, sold, for example, under the brands Home & Garden®, Medina®, Blubonic Industries®, FDC™, Citra Blast™, Mean Tangerine™. The Alkamuls® EL620 emulsifier is sold for example, under the DeWolf Chemical™ and Solvay® brands of castor oil ethoxylate (30). The modified acrylic emulsion copolymer is sold, for example, under the MakingCosmetics®, Golden Artist Colors®, Shalimar Chemical Works, Ltd. brands. The dipropylene glycol methyl ether is sold, for example, under the DOW Chemicals, Quality Chemical™, TCI Chemicals brands. The polysiloxane polymer is sold, for example, under the EcoAdvance™, Rainguard™, Foundation Armor® brands. The amine solution is sold, for example, under the ChemWorld™ and Aminovation Lab® brands.

In yet another exemplary embodiment of the invention, the composition includes approximately 20% by weight of D-Limonene, approximately 7% by weight of emulsifier (Alkamuls® EL620 brand emulsifier), approximately 15% by weight of water, approximately 50% by weight of modified acrylic emulsion copolymer, approximately 3% by weight of dipropylene glycol methyl ether, approximately 2% by weight of polysiloxane polymer; and approximately 3% by weight of amine solution.

In yet another exemplary embodiment of the invention, the composition includes approximately 15% by weight of D-Limonene, approximately 5% by weight of Alkamuls® EL620 brand emulsifier, approximately 20% by weight of water, approximately 55% by weight of modified acrylic emulsion copolymer, approximately 2% by weight of dipropylene glycol methyl ether, approximately 1% by weight of polysiloxane polymer, and approximately 2% by weight of amine solution.

In such exemplary embodiments of the invention, Home & Garden®. Cold Pressed orange oil, made by Green Gobbler™ is mixed with Safecoat® water based acrylic lacquer.

In accordance with embodiments of the invention a composition for preserving wood is presented. In such embodiments of the present invention, the composition includes mixing cold pressed orange oil comprised of at least 80% D-Limonene with commercially available existing wood preservatives, wherein the composition can be mixed in a ratio from 1%-99% by weight of cold pressed orange oil comprised of at least 80% D-Limonene and a ratio from 99%-1% by weight of commercially available existing wood preservative, respectfully. Examples of such commercially available existing wood preservatives are Safecoat®brand Safecoat® Acrylacq Gloss™ preservative, MINWAX® brand Polycrylic protective finish clear gloss preservative, Eco Wood Treatment® brand natural mineral-based wood preservative, TallEarth™ brand Eco-safe wood treatment non-toxic stain and preservative, EcoAdvance™ brand exterior wood silaxane waterproofer preservative. The composition further includes the following combinations, with each subsequent combination being more preferable than the prior: In one embodiment, the composition includes a ratio of 5% by weight of cold pressed orange oil comprised of at least 80% D-Limonene to 95% by weight of commercially available existing wood preservative. In yet another embodiment, the composition includes a ratio of 10% by weight of cold pressed orange oil comprised of at least 80% D-Limonene to 90% by weight of commercially available existing wood preservative. In another embodiment, the composition includes a ratio of 15% by weight of cold pressed orange oil comprised of at least 80% D-Limonene to 85% by weight of commercially available existing wood preservative. In yet another embodiment, the composition includes a ratio of 20% by weight of cold pressed orange oil comprised of at least 80% D-Limonene to 80% by weight of commercially available existing wood preservative preservative. In a most preferred embodiment, the composition includes a ratio of 25% by weight of cold pressed orange oil comprised of at least 80% D-Limonene to 75% by weight of commercially available existing wood preservative.

Also, in all embodiments of the present invention mentioned above, one could add another ingredient (for example, in place of a like amount, from 65%-99% by weight of the previous embodiments of the present invention and from 1%-35% by weight of commercially available pure Boric Acid, respectfully.

In one embodiment of the present invention, the composition includes 30% by weight of pure Boric Acid and 70% by weight of previous embodiments. In a most preferred embodiment of the present invention, the composition includes 20% by weight of pure Boric Acid and 80% by weight of previous embodiments. In another embodiment of the present invention, the composition includes 25% by weight of pure Boric Acid and 75% by weight of previous embodiments. In yet another embodiment, the composition includes 15% by weight of pure Boric Acid and 85% by weight of previous embodiments. In another embodiment, the composition includes 10% by weight of pure Boric Acid and 90% by weight of previous embodiments. In one embodiment, the composition includes 5% by weight pure Boric Acid and 95% by weight of previous embodiments. In yet another embodiment, the composition includes 2% by weight of pure Boric Acid and 98% by weight of previous embodiments. Boric acid is available under the following brand: Ecoxall.

In accordance with embodiments of the invention a termiticide composition is presented. In such embodiments of the present invention, the temicide composition includes approximately 25% by weight of D-Limonene, approximately 12% by weight of Boric Acid (pure boric acid manufactured by FDC™), approximately 5% by weight of emulsifier (Alkamuls® EL620), approximately 10% by weight of water, approximately 40% by weight of modified acrylic emulsion copolymer, approximately 5% by weight of dipropylene glycol methyl ether, approximately 1% by weight of polysiloxane polymer, and approximately 2% by weight of amine solution.

In one embodiment, the termiticide composition includes approximately 20% by weight of D-Limonene, approximately 15% by weight of Boric Acid, approximately 5% by weight of emulsifier (Alkamuls® EL620), approximately 5% by weight of water, approximately 50% by weight of modified acrylic emulsion copolymer, approximately 2% by weight of dipropylene glycol methyl ether, approximately 1% by weight of polysiloxane polymer, and approximately 2% by weight of amine solution.

In another embodiment, the termiticide composition includes approximately 15% by weight of D-Limonene, approximately 10% by weight of Boric Acid, approximately 3% by weight of emulsifier (Alkamuls® EL620), approximately 10% by weight of water, approximately 52% by weight of modified acrylic emulsion copolymer, approximately 7% by weight of dipropylene glycol methyl ether, approximately 1% by weight of polysiloxane polymer, and approximately 2% by weight of amine solution.

In yet another embodiment, the termiticide composition includes approximately 10% by weight of D-Limonene, approximately 10% by weight of Boric Acid, approximately 3% by weight of emulsifier (Alkamuls® EL620), approximately 10% by weight of water, approximately 55% by weight of modified acrylic emulsion copolymer, approximately 7% by weight of dipropylene glycol methyl ether, approximately 2% by weight of polysiloxane polymer, and approximately 3% by weight of amine solution.

To evidence the unexpectedly improved nature of the results obtained using embodiments of the claimed invention, the foregoing tests were performed. The following examples are intended to exemplify the claimed invention, and not to limit the claimed invention in any manner.

EXAMPLE 1

Objective

To demonstrate the effectiveness of a termicidal composition in accordance with embodiments disclosed herein, an experiment was conducted to evaluate treated cellulose material for its resistance to subterranean termites the American Wood Protection Association (AWPA) Standard E1-13 was implemented. In the experiment, single choice tests and two choice tests were performed simultaneously. The experiment tested wood treated with one embodiment of the claimed invention against Formosan subterranean termites, *Coptotermes forrnosanus*, as the targeted insect. The experiment was conducted utilizing the embodiment of the invention containing the insect repelling composition which includes approximately 25% by weight cold pressed orange oil component having a D-Limonene concentration of at least 80%, and approximately 75% by weight acrylic lacquer component, with the acrylic lacquer component comprising approximately 45% by weight modified acrylic emulsion copolymer, at least 40% by weight water, at least 5% by weight dipropylene glycol methyl ether, at least less than 5% by weight polysiloxane polymer, and at least less than 5% by weight amine solution. Five replications were made for each of the following treatments:

Treatment 1: Single choice test—Untreated controls.

Treatment 2: Single choice test—Wood blocks with one (1) coat of treatment applied.

Treatment 3: Single choice test—Wood block with two (2) coats of treatment applied.

Treatment 4: Two choice test—Control and wood blocks with two (2) coats of treatment applied.

Treatment 5: No wood blocks—Termites only to evaluate the overall health of the termites.

Methods

The wood specimens to be tested are allowed to air dry for one week and are then weighed. Sterilized glass jars are filled with 150 g of sand and 30 ml of distilled water. The sterilized glass jars are allowed to stand for two hours. For the single choice tests, a solitary test block is placed on the sand surface. For the two choice test, two different types of wood blocks, a treated wood block and a control wood block, are placed on opposite sides of the jar. A piece of aluminum foil is placed under each treated wood block to prevent leaching of the embodiment of the present invention into the sand.

Termites were collected from the field from the West End neighborhood in the city of New Orleans, Louisiana. The average weight of the collected termites were measured, as illustrated in Table 1 below. Four hundred termites, consisting of 380 worker termites and 20 soldier termites, were placed inside each test jar. These jars were maintained at 28° C. and 80% relative humidity (RH) for four weeks.

TABLE 1

Average Weight of Termites Collected Locally From West End Used in This Study

| Project Date: Jan. 4, 2019 Species Collected: | | FST | Collected by: Guidry *Coptotermes formosanus* | Y | NOMTCB Entomology Lab Recorded by: Guidry *Reticulitermes flavipes* | | | Assisted by: N | |
|---|---|---|---|---|---|---|---|---|---|
| | | Termi | tes | | | Group 1* | | Group 2* | |
| Source ID | Source Location | Collection Date | Collection Time | Collected By | # | Weight (g) | # | Weight (g) | |
| | West End | Jan. 4, 2019 | 1:00 PM | Guildry | 100 | 0.312 | 100 | 0.308 | |
| | | January Assited by: Conditions | Sunny | 2019 Balance: | WPG 202 | Termite Collection Page: 3 of 3 | | | |
| | | Group 3* | | Group 4* | | Group 5* | | Average | |
| | | # | Weight (g) | # | Weight (g) | # | Weight (g) | Weight (g) | |
| | | 100 | 0.311 | 100 | 0.313 | 100 | 0.312 | 0.311 | |

*Group of 100+ termites, record number of termites and total weight

Each jar is weighed weekly to ensure moisture level is maintained. At the end of the four weeks, test jars are disassembled.

Each block is removed, cleaned with a brush, and allowed to air dry before weighing, as shown in Table 2 below.

The number of live termite workers and soldiers are determined for each test jar, as shown in Table 3 below.

Each test block was visually rated using the rating system defined in the AWPA E1 Standard below:

| | AWPA E1 Standard Visual Rating System of Each Test Block | |
|---|---|---|
| Grade # | Description of Condition | Cross Section Affected (%) |
| 10 | Sound (No Biological Deterioration) | N/A |
| 9.5 | Trace surface nibbles | N/A |
| 9 | Slight attack | ≤3 |
| 8 | Moderate attack | 3-10 |
| 7 | Moderate/severe attack, penetration | 10-30 |
| 6 | Severe attack | 30-50 |
| 4 | Very severe attack | 50-75 |
| 0 | Failure | |

RESULTS

The following Table 2 illustrates the weights of test blocks before and after being exposed to Formosan subterranean termites.

TABLE 2

Weights of Test Blocks Before and After Being Exposed to Formosan Subterranean Termites

| Project #: D'Amico | | NOMTCB Entomology Lab | | December | 2018 | SOP 440 Form A Termite Blocks |
| Start Date Jan. 7, 2019 | Measured by: | Guidry | Recorded by: | Caliper: | Oven: | |
| End Date: Feb. 4, 2019 | Measured by: | Guidry | Recorded by: | Caliper: | Oven: | |

| | | Specimen | | | Dimensions (mm) | | | Weight (g) | | Visual |
|---|---|---|---|---|---|---|---|---|---|---|
| Type | Replicate No. | Specimen No. | Wood Species | Substrate | Length | Width | Thickness | Initial | Final | Rating |
| Control | 1 | C1 | pine | sand | 38.4 | 38.3 | 4.7 | 2.755 | 1.902 | 4 |
| Control | 2 | C2 | pine | sand | 38.2 | 38.1 | 5.0 | 3.202 | 2.230 | 7 |
| Control | 3 | C3 | pine | sand | 38.2 | 38.1 | 4.7 | 2.942 | 1.940 | 6 |
| Control | 4 | C4 | pine | sand | 38.2 | 38.1 | 5.2 | 3.462 | 2.528 | 7 |
| Control | 5 | C5 | pine | sand | 38.2 | 38.1 | 4.6 | 2.956 | 2.120 | 7 |
| One Coat | 6 | 1-1 | pine | sand | 38.6 | 38.7 | 6.0 | 4.546 | 4.019 | 8 |
| One Coat | 7 | 1-2 | pine | sand | 38.6 | 38.8 | 6.7 | 4.780 | 4.280 | 8 |
| One Coat | 8 | 1-3 | pine | sand | 38.6 | 38.5 | 6.5 | 4.724 | 4.367 | 8 |
| One Coat | 9 | 1-4 | pine | sand | 38.6 | 38.5 | 4.1 | 2.989 | 2.697 | 8 |
| One Coat | 10 | 1-5 | pine | sand | 39.1 | 38.9 | 4.6 | 3.514 | 3.112 | 8 |
| Two Coats | 11 | 2-1 | pine | sand | 39.2 | 38.8 | 6.3 | 4.772 | 4.408 | 8 |
| Two Coats | 12 | 2-2 | pine | sand | 39.1 | 38.9 | 5.3 | 4.632 | 4.292 | 9 |
| Two Coats | 13 | 2-3 | pine | sand | 38.9 | 39.3 | 5.9 | 4.601 | 4.263 | 9 |
| Two Coats | 14 | 2-4 | pine | sand | 38.9 | 38.8 | 5.9 | 4.855 | 4.527 | 9 |
| Two Coats | 15 | 2-5 | pine | sand | 38.8 | 38.6 | 7.0 | 5.891 | 5.611 | 9.5 |
| Two coats (choice test) | 16 | 2-6 | pine | sand | 39.1 | 38.9 | 5.3 | 4.634 | 4.497 | 10 |
| Control (choice test) | 16 | C6 | pine | sand | 38.3 | 38.3 | 4.9 | 3.139 | 2.501 | 8 |
| Two coats (choice test) | 17 | 2-7 | pine | sand | 39.2 | 38.5 | 5.2 | 4.296 | 4.179 | 10 |
| Control (choice test) | 17 | C7 | pine | sand | 38.5 | 38.2 | 4.7 | 3.244 | 2.579 | 7 |
| Two coats (choice test) | 18 | 2-8 | pine | sand | 39.1 | 38.0 | 5.4 | 4.863 | 4.711 | 10 |
| Control (choice test) | 18 | C8 | pine | sand | 38.3 | 38.2 | 4.5 | 2.588 | 1.980 | 7 |

TABLE 2-continued

Weights of Test Blocks Before and After Being Exposed to Formosan Subterranean Termites

| | | | | | | | | | | |
|---|---|---|---|---|---|---|---|---|---|---|
| Two coats (choice test) | 19 | 2-9 | pine | sand | 39.7 | 38.7 | 5.1 | 4.223 | 4.097 | 10 |
| Control (choice test) | 19 | C9 | pine | sand | 38.4 | 38.3 | 4.3 | 2.802 | 2.129 | 7 |
| Two coats (choice test) | 20 | 2-10 | pine | sand | 38.4 | 38.6 | 6.8 | 4.414 | 4.305 | 10 |
| Control (choice test) | 20 | C10 | pine | samd | 38.4 | 38.2 | 5.0 | 3.149 | 2.562 | 7 |

For the single choice tests, the average weight consumed of the control, untreated, wood was 0.919 g, while that of the wood treated with one coat of the composition was 0.416 g and the wood treated with two coats of the composition was 0.330 g. Testing revealed that there was a statistically significant difference in the amount of untreated wood consumed and the amount of treated wood consumed (P=0.005). However, there was not a significant difference in wood consumption between the wood blocks treated with one coat and the wood blocks treated with two coats of the composition.

Figure 2:
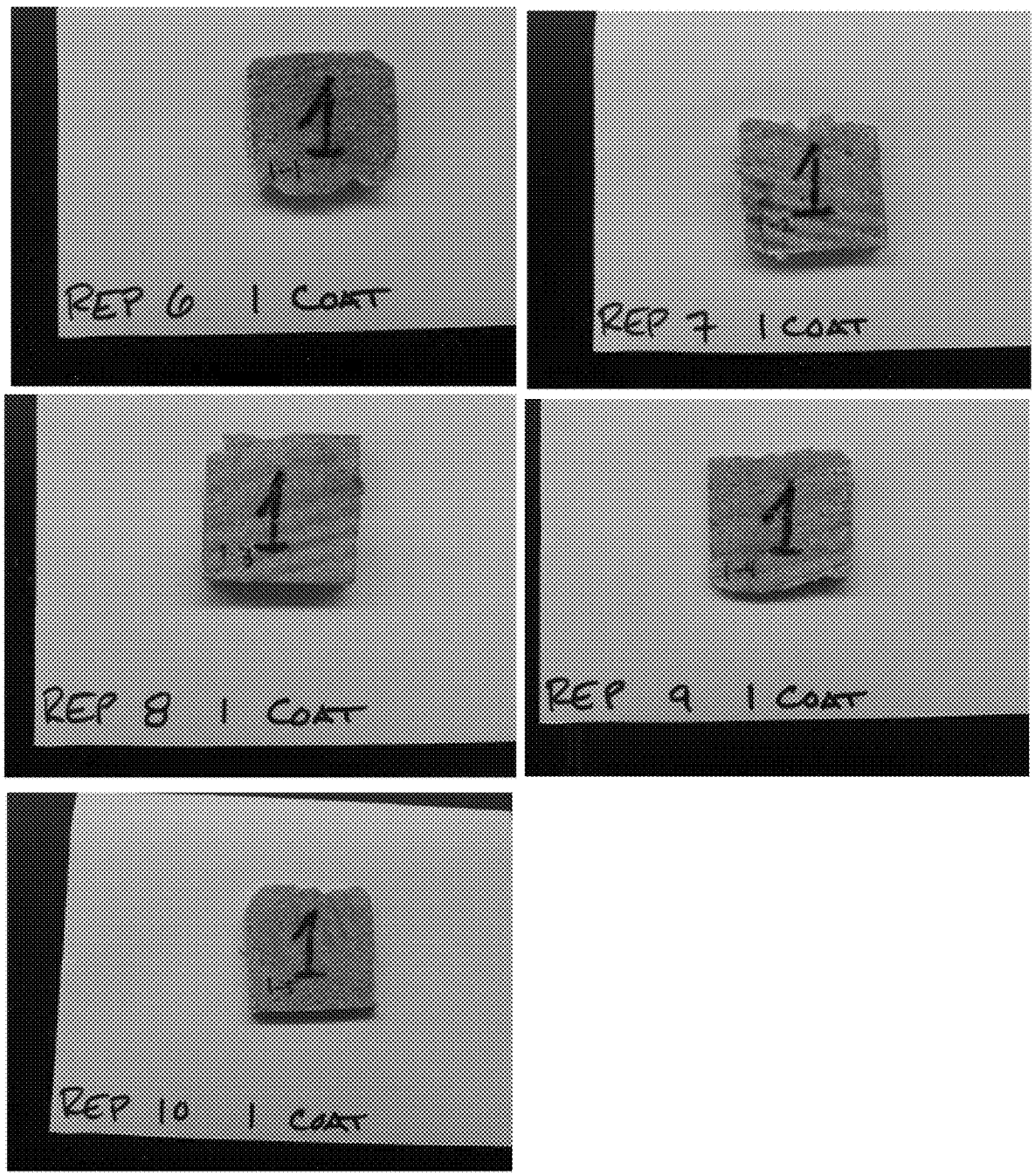
FIG. 2. is a photograph showing a series of wood blocks treated with exemplary compositions described herein in accordance with embodiments of the invention to evaluate the effectiveness of such compositions.
Figure 3:
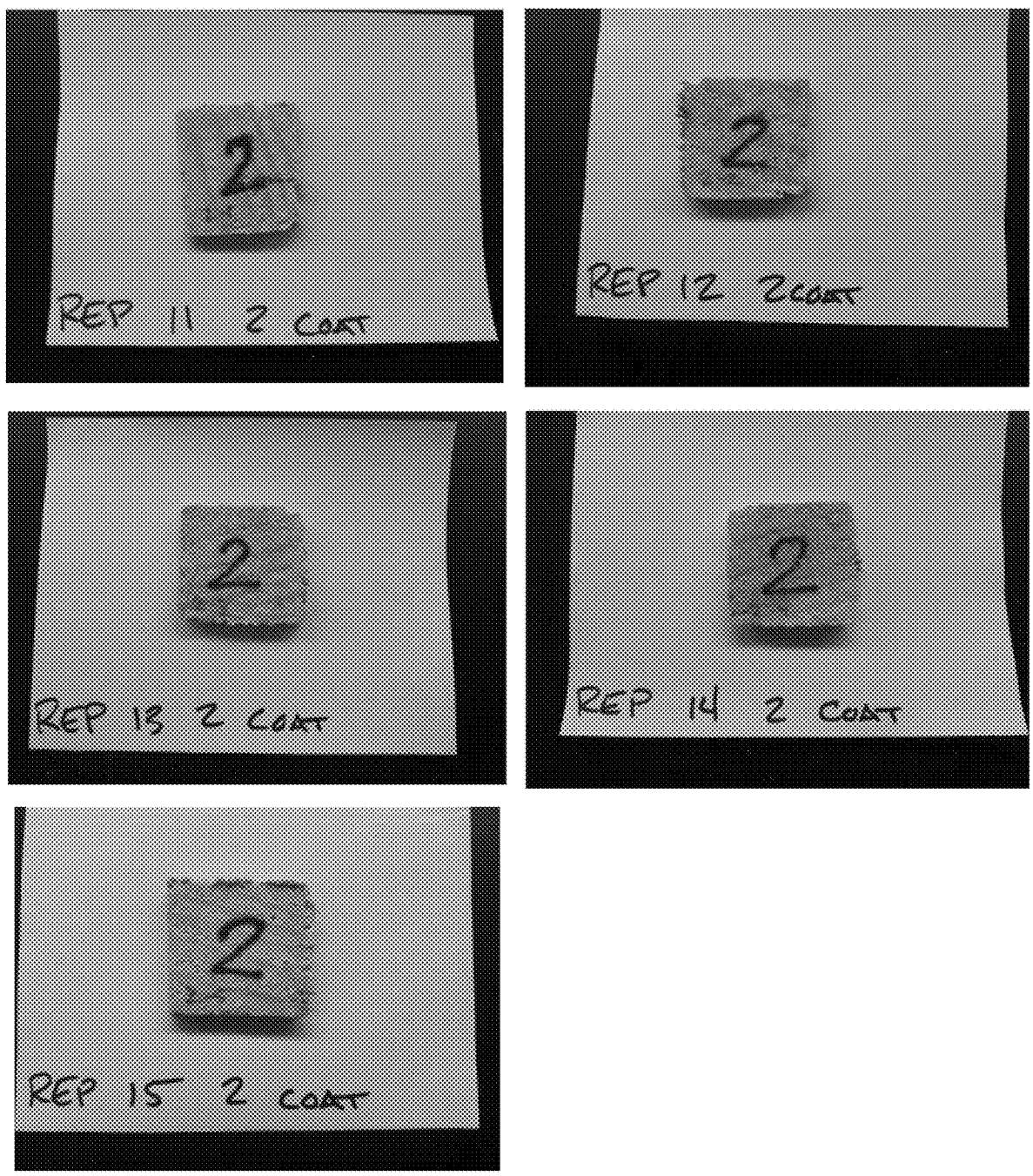
FIG. 3 is a photograph showing a series of wood blocks treated with exemplary compositions described herein in accordance with embodiments of the invention to evaluate the effectiveness of such compositions.

FIG. 1 illustrates a photograph of the control, untreated wood block samples after the experiment, wherein the termites consumed on average 30.114% of the wood blocks, by weight. As seen in FIG. 2, which illustrates a photograph of the wood samples treated with one coat of the composition, in accordance with embodiments of the invention, after the experiment, wherein the termites consumed on average 10.164% of the wood blocks, by weight. As seen in FIG. 3, which illustrates a photograph of the wood samples treated with two coats of the composition, in accordance with embodiments of the invention, after the experiment, wherein the termites consumed on average 6.764% of the wood blocks, by weight.

Figure 4:
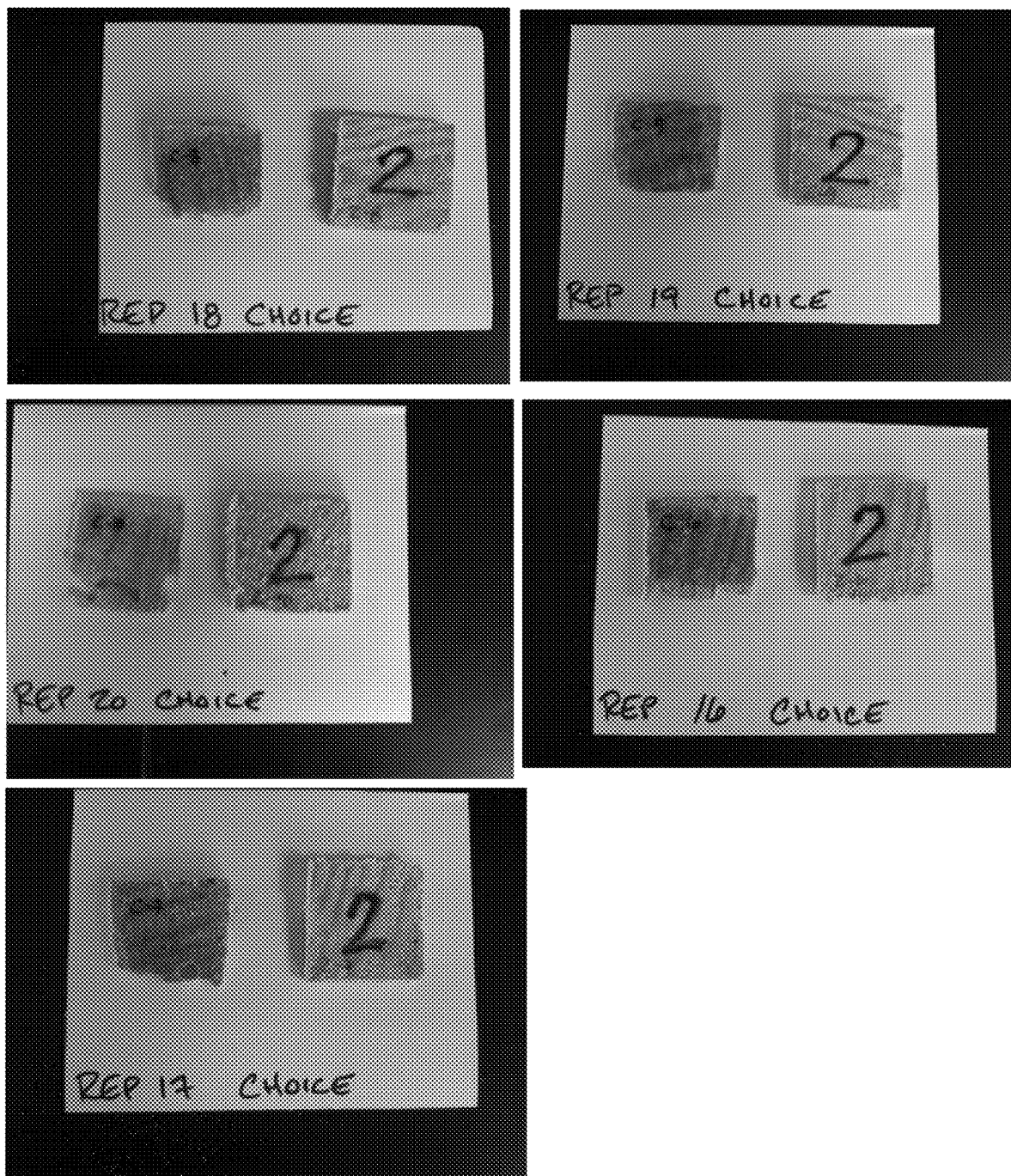
FIG. 4 is a photograph showing a series of sets of untreated wood blocks and treated wood blocks treated with compositions described herein in accordance with embodiments of the invention, to evaluate and compare the effectiveness of such compositions.

The experiment revealed that there was a significant difference between wood consumption (P=0.008) for the two choice test. Termites consumed significantly more of the untreated wood blocks than the wood blocks treated with two coats of the composition. As seen in FIG. 4, which illustrates a photograph of the two choice control, untreated wood block samples and treated wood block samples with two coats of the composition, in accordance with embodiments of the invention, after the experiment, wherein the termites consumed on average 21.392% of the untreated wood blocks, by weight, and consumed on average 2.852% of the two coat treated wood blocks.

Table 3 illustrates the test jar weights taken throughout the study and the numbers of live termites in each jar at the beginning of the study and at the end of the study.

TABLE 3

Test Jar Weights Throughout Study and Numbers of Live Termites at the Beginning and End of Study

| Project #: D'Amico | | NOMTCB Entomology Lab | | JANUARY | | 2019 | | | SOP 440 Form B | | |
|---|---|---|---|---|---|---|---|---|---|---|---|
| Assembly Date: Jan. 7, 2019 | Time: | No Choice Test | Choice Test | Assembled by: Guidry | | Recorded by: Guidry | | | Termite Test Assemblies | | |
| Environmental Chamber: | | T (° C.): | 28 | % RH: 80 | Balance: | Hygro-meter: | | Data Logger: | | | |
| Container Size: Test Assemblies | | Measured by: Initial Termite Count | | Weight (g) | | | | | Final Live Termite Count | | |

| Container No. | Block No(s). | Worker | Soldier | Total | Sand | Initial Assembly | Jan. 14, 2019 | Jan. 22, 2019 | Jan. 28, 2019 | Feb. 4, 2019 | Worker | Soldier | Total |
|---|---|---|---|---|---|---|---|---|---|---|---|---|---|
| 1 | | 380 | 20 | 400 | 150 | 402.7 | 402.2 | 401.4 | 401.1 | 400.6 | 332 | 19 | 351 |
| 2 | | 380 | 20 | 400 | 150 | 406.8 | 406.5 | 405.8 | 405.4 | 404.9 | 333 | 17 | 350 |
| 3 | | 380 | 20 | 400 | 150 | 407.1 | 406.7 | 406.1 | 405.8 | 405.3 | 340 | 19 | 359 |
| 4 | | 380 | 20 | 400 | 150 | 406.0 | 405.3 | 403.9 | 403.3 | 402.5 | 340 | 16 | 356 |
| 5 | | 380 | 20 | 400 | 150 | 406.0 | 405.6 | 405.0 | 404.5 | 404.0 | 329 | 16 | 345 |
| 6 | | 380 | 20 | 400 | 150 | 408.6 | 408.2 | 407.6 | 407.3 | 406.9 | 254 | 20 | 274 |
| 7 | | 380 | 20 | 400 | 150 | 409.3 | 408.9 | 407.9 | 407.4 | 406.6 | 251 | 17 | 268 |
| 8 | | 380 | 20 | 400 | 150 | 408.9 | 408.4 | 407.2 | 406.7 | 405.8 | 188 | 20 | 208 |
| 9 | | 380 | 20 | 400 | 150 | 407.8 | 407.7 | 407.1 | 407.0 | 406.6 | 247 | 20 | 267 |
| 10 | | 380 | 20 | 400 | 150 | 408.1 | 407.8 | 407.0 | 406.7 | 406.0 | 230 | 18 | 248 |
| 11 | | 380 | 20 | 400 | 150 | 410.0 | 409.7 | 408.7 | 408.4 | 408.0 | 183 | 15 | 198 |
| 12 | | 380 | 20 | 400 | 150 | 410.0 | 409.6 | 408.6 | 408.2 | 407.6 | 216 | 13 | 229 |
| 13 | | 380 | 20 | 400 | 150 | 408.6 | 408.3 | 407.3 | 406.9 | 406.4 | 178 | 11 | 189 |
| 14 | | 380 | 20 | 400 | 150 | 409.0 | 408.8 | 408.1 | 407.8 | 407.3 | 171 | 14 | 185 |
| 15 | | 380 | 20 | 400 | 150 | 410.4 | 410.1 | 409.3 | 408.9 | 408.3 | 165 | 6 | 171 |
| 16 | | 380 | 20 | 400 | 150 | 410.7 | 410.4 | 409.4 | 409.0 | 408.3 | 264 | 14 | 278 |
| 17 | | 380 | 20 | 400 | 150 | 411.4 | 411.1 | 410.3 | 409.9 | 409.4 | 280 | 19 | 299 |
| 18 | | 380 | 20 | 400 | 150 | 411.7 | 411.5 | 410.6 | 410.3 | 409.6 | 276 | 12 | 288 |
| 19 | | 380 | 20 | 400 | 150 | 410.6 | 410.3 | 409.1 | 408.6 | 407.8 | 297 | 20 | 317 |

TABLE 3-continued

Test Jar Weights Throughout Study and Numbers of Live Termites at the Beginning and End of Study

| 20 | 380 | 20 | 400 | 150  | 411.0 | 410.7 | 409.8 | 409.4 | 408.9 | 296 | 19 | 315 |
| 21 | 380 | 20 | 400 | 150  | 405.6 |       |       |       |       | 338 | 19 | 357 |
| 22 | 380 | 20 | 400 | 150  | 404.6 |       |       |       |       | 329 | 17 | 346 |
| 23 | 380 | 20 | 400 | 1540 | 403.7 |       |       |       |       | 343 | 15 | 358 |
| 24 | 380 | 20 | 400 | 150  | 404.3 |       |       |       |       | 362 | 18 | 380 |
| 25 | 380 | 20 | 400 | 150  | 403.0 |       |       |       |       | 318 | 17 | 355 |

Based on jar weights, the experiment revealed that the test jars did not lose enough moisture during this study to warrant the addition of any more water.

The experiment revealed that there was a significant difference in termite mortality among treatments (P<0.001). Analysis of variance (ANOVA) was performed following a Tukey Test to rank treatments, as illustrated in Table 4, which utilized pairwise multiple comparisons between treatments. The treatments tested in this experiment which are ranked with the same letter showed no significant differences in termite mortality.

TABLE 4

| Treatment | Average Mortality | Average Mortality Percentage | Ranking |
|---|---|---|---|
| Control (no treatment) | 47.8 | 11.95% | A |
| Termites only (no wood, after one week) | 44.8 | 11.20% | A |
| One coat of treatment | 147.0 | 36.75% | B |
| Two coats of treatment | 205.6 | 51.4% | C |
| Choice test | 100.6 | 25.15% | D |

This experiment indicated that the compositions disclosed herein, in accordance with embodiments of the invention, are highly effective at repelling termites from wood treated with such disclosed compositions, and the disclosed compositions significantly increased the average mortality rates of the exposed populations of termites in comparison to untreated wood samples. The single choice wood blocks treated with two coats of the composition resulted in termites only consuming on average 6.764% of the wood blocks and killed approximately 51.4% of the termites. The single choice wood blocks treated with one coat of the composition resulted in termites only consuming on average 10.164% of the wood blocks and killed approximately 36.75% of the termites. In comparison, the single choice untreated, control wood blocks resulted in termites consuming 30.114% of the wood blocks and only 11.95% of the termites died. Under the two choice test, approximately 25.15% of the termites died and while the termites consumed on average 21.392% of the untreated, control wood blocks, only 2.852% of the two coat treated wood blocks were consumed.

EXAMPLE 2

Objective

To further evaluate the effectiveness of termiticidal compositions disclosed herein in accordance with embodiments of the invention, an additional experiment was conducted to evaluate treated cellulose material for its resistance to subterranean termites and to compare conventional termiticide to the compositions, in accordance with embodiments of the invention. The American Wood Protection Association (AWPA) Standard E1-13 was implemented. In the experiment, single choice tests and two choice tests were performed simultaneously. The experiment tested wood samples treated with four different compositions, of which three of the compositions were provided in accordance with embodiments of the invention disclosed herein, and the fourth composition was the conventional BORA-CARE® termiticide composition produced by Nisus Corporation. The tested wood samples were treated with a Treatment Y, a Treatment X, a Treatment B, and a Treatment BC, for use against Formosan subterranean termites, *Coptotermes forrnosanus*, as the targeted insect.

The experiment was conducted utilizing the following treatments:

Treatment Y includes soaking the wood block in pure cold pressed orange oil, containing at least 80% D-Limonene, until the wood is completely saturated, then allowing the wood to dry and then coating the wood with a composition, in accordance with embodiments of the present invention. The composition included approximately 25% by weight cold pressed orange oil component having a D-Limonene concentration of at least 80%, and approximately 75% by weight acrylic lacquer component, with the acrylic lacquer component comprising approximately 45% by weight modified acrylic emulsion copolymer, at least 40% by weight water, at least 5% by weight dipropylene glycol methyl ether, at least less than 5% by weight polysiloxane polymer, and at least less than 5% by weight amine solution.

Treatment X, includes coating the wood with a composition, in accordance with embodiments of the present invention, which includes approximately 25% by weight cold pressed orange oil component having a D-Limonene concentration of at least 95%, and approximately 75% by weight acrylic lacquer component, with the acrylic lacquer component comprising approximately 45% by weight modified acrylic emulsion copolymer, at least 40% by weight water, at least 5% by weight dipropylene glycol methyl ether, at least less than 5% by weight polysiloxane polymer, and at least less than 5% by weight amine solution.

Treatment B, includes coating the wood with a mixture of Treatment X and approximately 25%, by weight pure boric acid (in power form).

Treatment BC, includes coating the wood with the conventional termiticide BORA-CARE®.

Five replications were made for each of the following treatments:

Treatment 1: Single choice test—Untreated controls.

Treatment 2: Single choice test—Wood blocks with Treatment Y applied.

Treatment 3: Single choice test—Wood block with Treatment B applied.

Treatment 4: Single choice test—Wood block with Treatment BC applied.

Treatment 5: Single choice test—Wood block with Treatment X applied.

Treatment 6: Two choice test—Wood block with Treatment BC applied and Wood block with Treatment X applied.

Treatment 7: No wood blocks—Termites only to evaluate the overall health of the termites.

Methods

The wood specimens to be tested are allowed to air dry for at least one week and are then weighed. Sterilized glass jars are filled with 150 g of sand and 30 ml of distilled water. The sterilized glass jars are allowed to stand for two hours. For the single choice tests, a solitary test block is placed on the sand surface. For the two choice test, two different types of wood blocks, a wood block treated with Treatment BC and a wood block treated with Treatment X, are placed on opposite sides of the jar. A piece of aluminum foil is placed under each treated wood block to prevent leaching of the embodiments of the present invention into the sand.

Termites were collected from the field from the Elysian neighborhood in the city of New Orleans, Louisiana. The average weight of the collected termites were measured, as illustrated in Table 1 below. Four hundred termites, consisting of 360 worker termites and 40 soldier termites, were placed inside each test jar. These jars were maintained at 28° C. and 80% relative humidity (RH) for four weeks.

TABLE 1

Average Weight of Termites Collected Locally From West End Used in This Study

| Project Date: Jul. 17, 2019 Species Collected: | D'Amico | FST | Collected by: Guidry Coptotermes formosanus | Y | NOMTCB Entomology Lab Recorded by: Guidry Reticulitermes flavipes | | Assisted by: N | |
|---|---|---|---|---|---|---|---|---|
| | | Termites | | | | Group 1* | | Group 2* |
| Source ID | Source Location | Collection Date | Collection Time | Collected By | | # | Weight (g) | # | Weight (g) |
| | Elysian | Jul. 16, 2019 | 2:00 PM | Guildry | | 100 | 0.314 | 100 | 0.300 |
| | | July Assisted by: Conditions Sunny | | 2019 Balance: | WPG 202 | SOP 440 Form C Termite Collection Page: 3 of 3 | | |

| | Group 3* | | Group 4* | | Group 5* | | Average |
|---|---|---|---|---|---|---|---|
| # | Weight (g) | # | Weight (g) | # | Weight (g) | Weight (g) |
| 100 | 0.287 | 100 | 0.282 | 100 | 0.289 | 0.294 |

*Group of 100+ termites, record number of termites and total weight

Each jar is weighed weekly to ensure moisture level is maintained. At the end of the four weeks, test jars are disassembled. Each block is removed, cleaned with a brush, and allowed to air dry before weighing, as shown in Table 2 below.

The number of live termite workers and soldiers are determined for each test jar, as shown in Table 4 below.

Each test block was visually rated using the rating system defined in the AWPA E1 Standard below:

AWPA E1 Standard
Visual Rating System of Each Test Block

| Grade # | Description of Condition | Cross Section Affected (%) |
|---|---|---|
| 10 | Sound (No Biological Deterioration) | N/A |
| 9.5 | Trace surface nibbles | N/A |
| 9 | Slight attack | ≤3 |
| 8 | Moderate attack | 3-10 |
| 7 | Moderate/severe attack, penetration | 10-30 |
| 6 | Severe attack | 30-50 |
| 4 | Very severe attack | 50-75 |
| 0 | Failure | |

RESULTS

The following Table 2 illustrates the weights of test blocks before and after being exposed to Formosan subterranean termites.

TABLE 2

Weights of Test Blocks Before and After Being Exposed to Formosan Subterranean Termites

| Project #: D'Amico | | NOMTCB Entomology Lab | | | | December | 2018 | SOP 440 Form A |
|---|---|---|---|---|---|---|---|---|
| Start Date: Jul. 17, 2019 | Measured by: | Cottone Guidry | Recorded by: Guidry | Balance: | WPG 202 | Caliper: XXY | Oven: | WPG 204 Termite Blocks |
| End Date: Aug. 27, 2019 | Measured by: | Guidry | Recorded by: Guidry | Balance: | WPG 202 | Caliper: XXY | Oven: | WPG 204 |

| Specimen | | | | | Weight (g) | | |
|---|---|---|---|---|---|---|---|
| Type | Replicate No. | Specimen No. | Wood Species | Substrate | Initial | Final | Visual Rating |
| Single Choice Tests | | | | | | | |
| Control | 1 | 1 | pine | sand | 1.613 | 0.783 | 4 |
| Control | 2 | 2 | pine | sand | 1.342 | 0.556 | 4 |
| Control | 3 | 3 | pine | sand | 1.601 | 0.792 | 0 |
| Control | 4 | 4 | pine | sand | 1.868 | 0.859 | 0 |
| Control | 5 | 5 | pine | sand | 1.775 | 1.036 | 0 |
| Y | 1 | 6 | pine | sand | 6.370 | 6.064 | 9.5 |
| Y | 2 | 7 | pine | sand | 6.725 | 6.417 | 9.5 |
| Y | 3 | 8 | pine | sand | 6.400 | 6.075 | 10 |
| Y | 4 | 9 | pine | sand | 6.154 | 5.833 | 10 |
| Y | 5 | 10 | pine | sand | 6.887 | 6.602 | 10 |
| B | 1 | 11 | pine | sand | 4.907 | 4.692 | 10 |
| B | 2 | 12 | pine | sand | 5.087 | 4.871 | 10 |
| B | 3 | 13 | pine | sand | 5.572 | 5.395 | 10 |
| B | 4 | 14 | pine | sand | 5.645 | 5.436 | 10 |
| B | 5 | 15 | pine | sand | 5.672 | 5.487 | 10 |
| BC | 1 | 15 | pine | sand | 6.901 | 5.539 | 10 |
| BC | 2 | 17 | pine | sand | 7.780 | 5.578 | 10 |
| BC | 3 | 18 | pine | sand | 5.126 | 3.954 | 10 |
| BC | 4 | 19 | pine | sand | 6.833 | 5.382 | 10 |
| BC | 5 | 20 | pine | sand | 7.424 | 6.129 | 10 |
| X | 1 | 21 | pine | sand | 6.227 | 5.765 | 8 |
| X | 2 | 22 | pine | sand | 6.156 | 5.864 | 9.5 |
| X | 3 | 23 | pine | sand | 5.405 | 5.080 | 9.5 |
| X | 4 | 24 | pine | sand | 5.590 | 5.136 | 7 |
| X | 5 | 25 | pine | samd | 4.671 | 4.425 | 9.5 |
| Two Choice Test | | | | | | | |
| BC | 1 | 26 | pine | samd | 6.529 | 4.568 | 10 |
| BC | 2 | 27 | pine | samd | 5.253 | 4.015 | 10 |
| BC | 3 | 28 | pine | samd | 5.915 | 4.273 | 10 |
| BC | 4 | 29 | pine | samd | 7.031 | 5.480 | 10 |
| BC | 5 | 30 | pine | samd | 6.048 | 6.359 | 10 |
| X | 1 | 31 | pine | samd | 5.093 | 4.906 | 10 |
| X | 2 | 32 | pine | samd | 5.301 | 5.098 | 10 |
| X | 3 | 33 | pine | samd | 5.322 | 5.145 | 10 |
| X | 4 | 34 | pine | samd | 5.793 | 5.642 | 10 |
| X | 5 | 35 | pine | samd | 5.280 | 5.128 | 10 |

For the single choice tests, the average weight consumed of the control, untreated, wood was 0.835 g, while that of the wood treated with Treatment Y of the composition was 0.309 g, the wood treated with Treatment B of the composition was 0.200 g, the wood treated with Treatment BC of the composition was 1.496 g, and the wood treated with Treatment X of the composition was 0.356 g. Testing revealed that there was a statistically significant difference in the amount of untreated wood consumed and the amount of treated wood consumed (P<0.001).

Analysis of variance (ANOVA) was performed following a Tukey Test to rank treatments for the Single choice tests, as illustrated in Table 3 below, which utilized pairwise multiple comparisons between treatments. The treatments tested in this experiment which are ranked with the same letter showed no significant differences in termite mortality.

TABLE 3

| Treatment | Average Consumption | Average Percentage Consumption | Ranking |
|---|---|---|---|
| Control (no treatment) | 0.835 | 51.24% | A |
| Y | 0.309 | 4.762% | B |
| X | 0.356 | 6.312% | B |
| B | 0.200 | 3.754% | B |
| BC | 1.496 | 21.92% | C |

Figure 5:
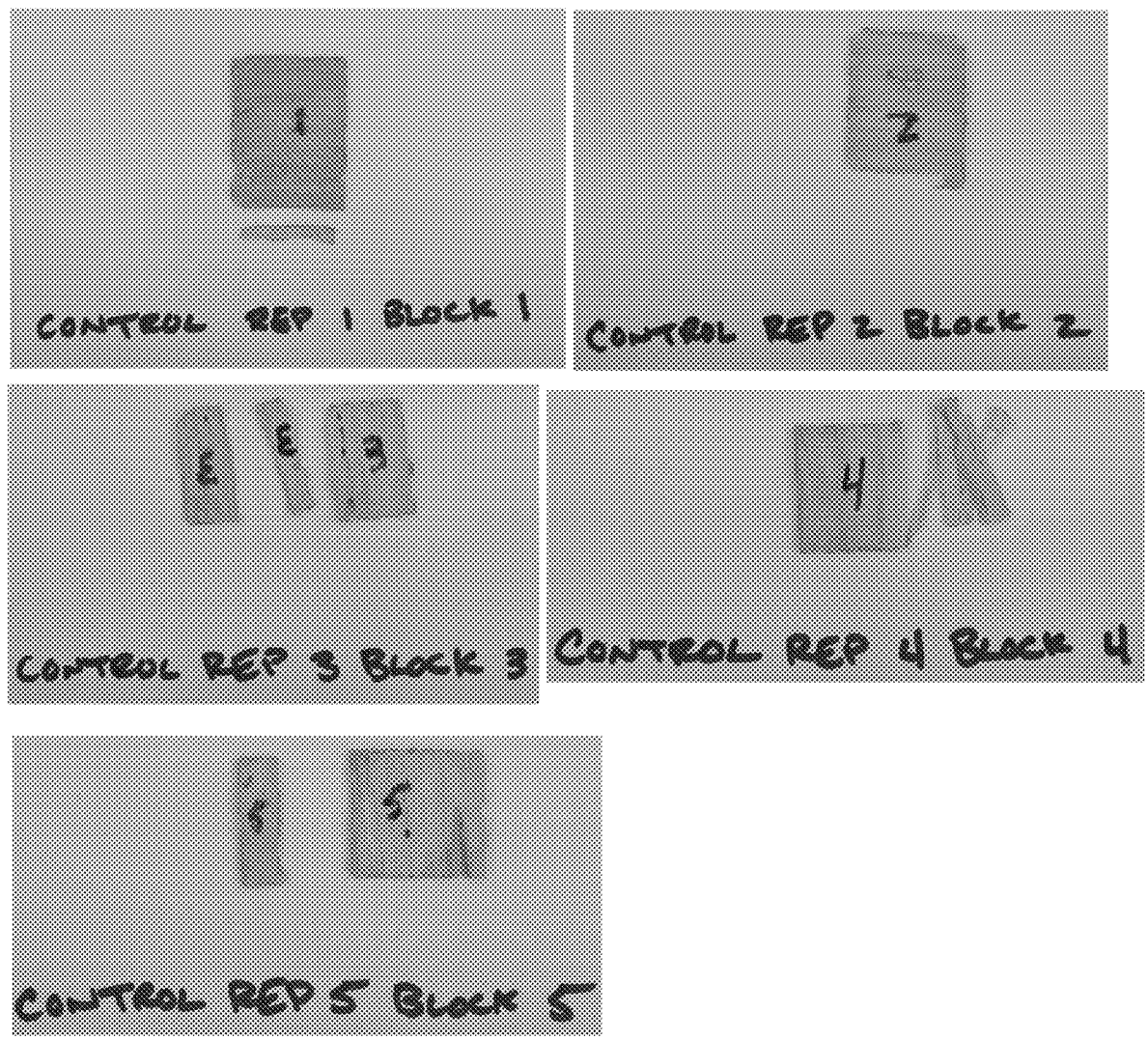
FIG. 5 is a photograph showing a series of untreated wood blocks which were used as testing controls to evaluate the compositions of the present invention.
Figure 6:
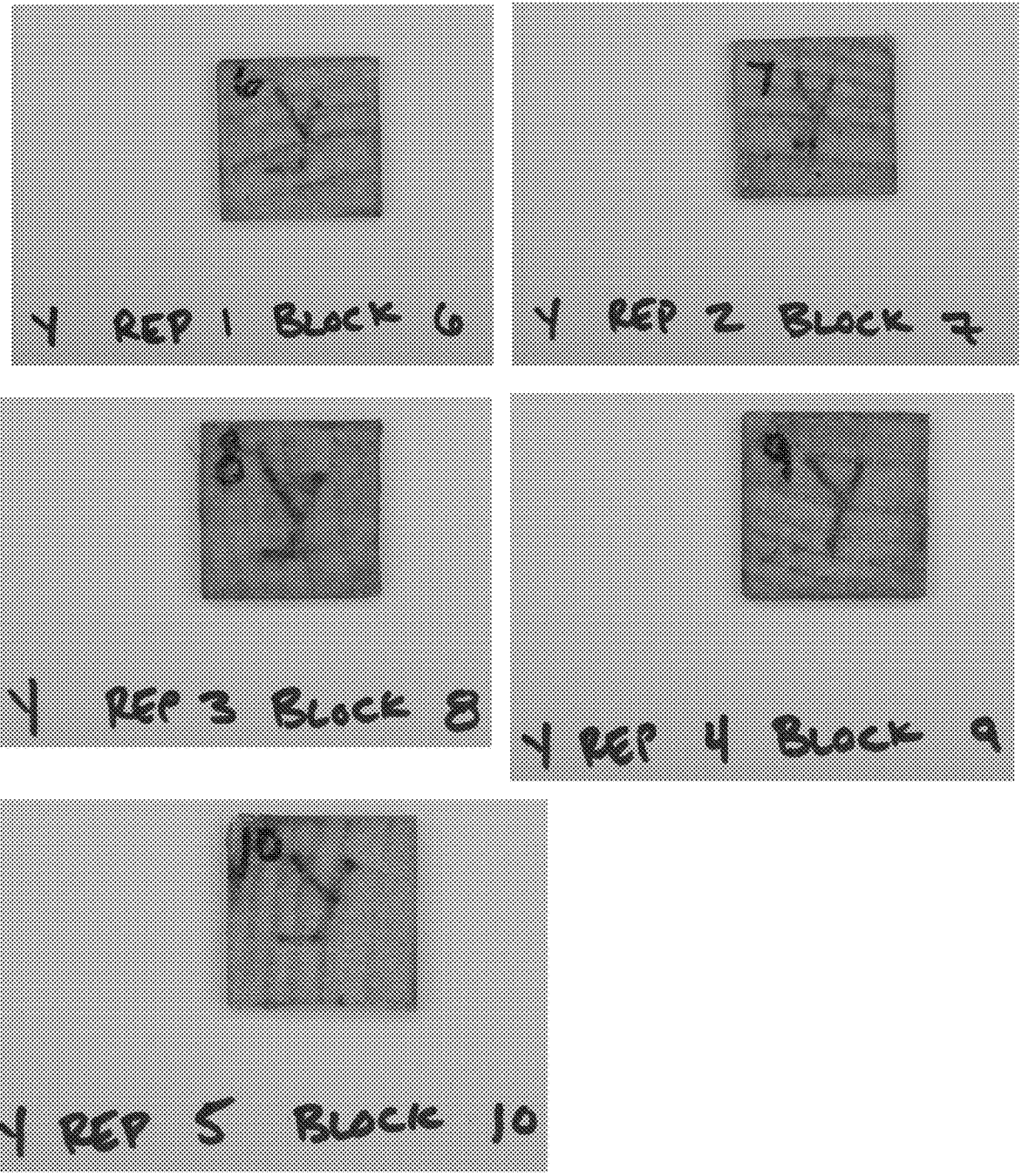
FIG. 6 is a photograph showing a series of wood blocks treated with exemplary compositions described herein in accordance with embodiments of the invention to evaluate the effectiveness of such compositions.
Figure 7:
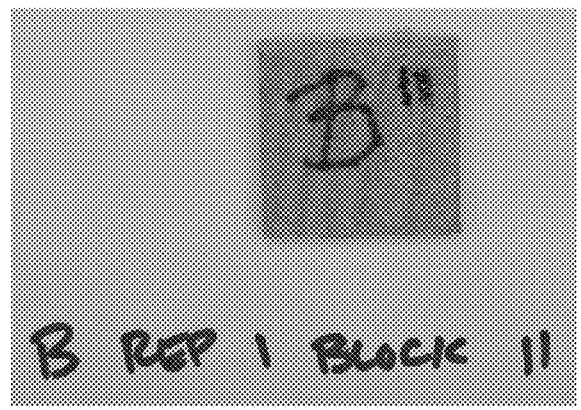
FIG. 7 is a photograph showing a series of wood blocks treated with exemplary compositions described herein in accordance with embodiments of the invention to evaluate the effectiveness of such compositions.
Figure 7:
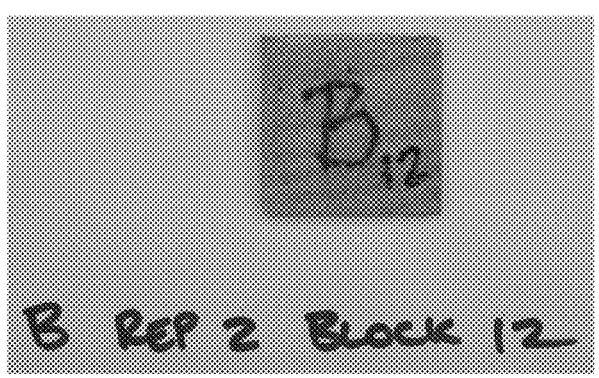
Figure 7:
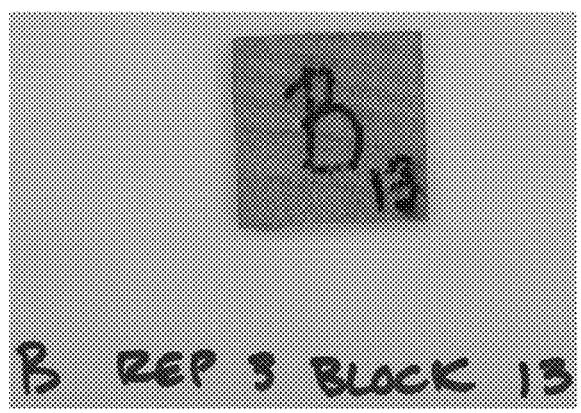
Figure 7:
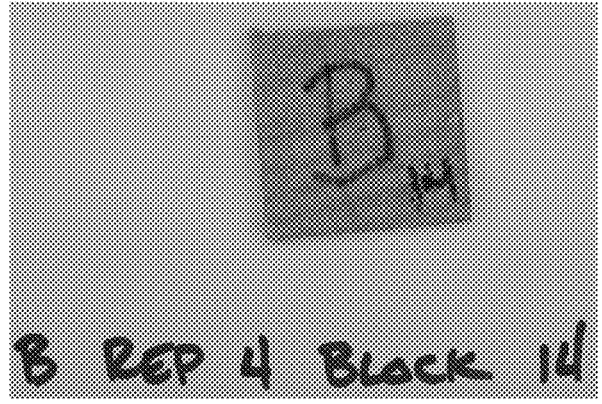
Figure 7:
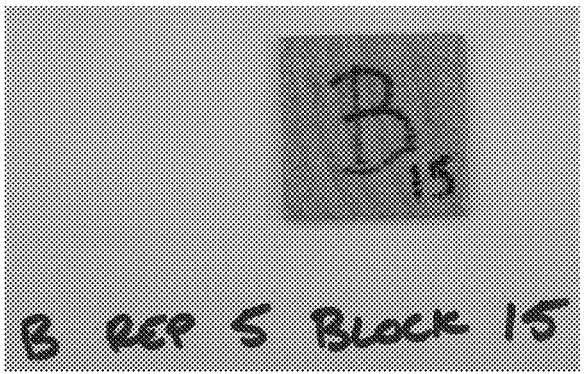
Figure 8:
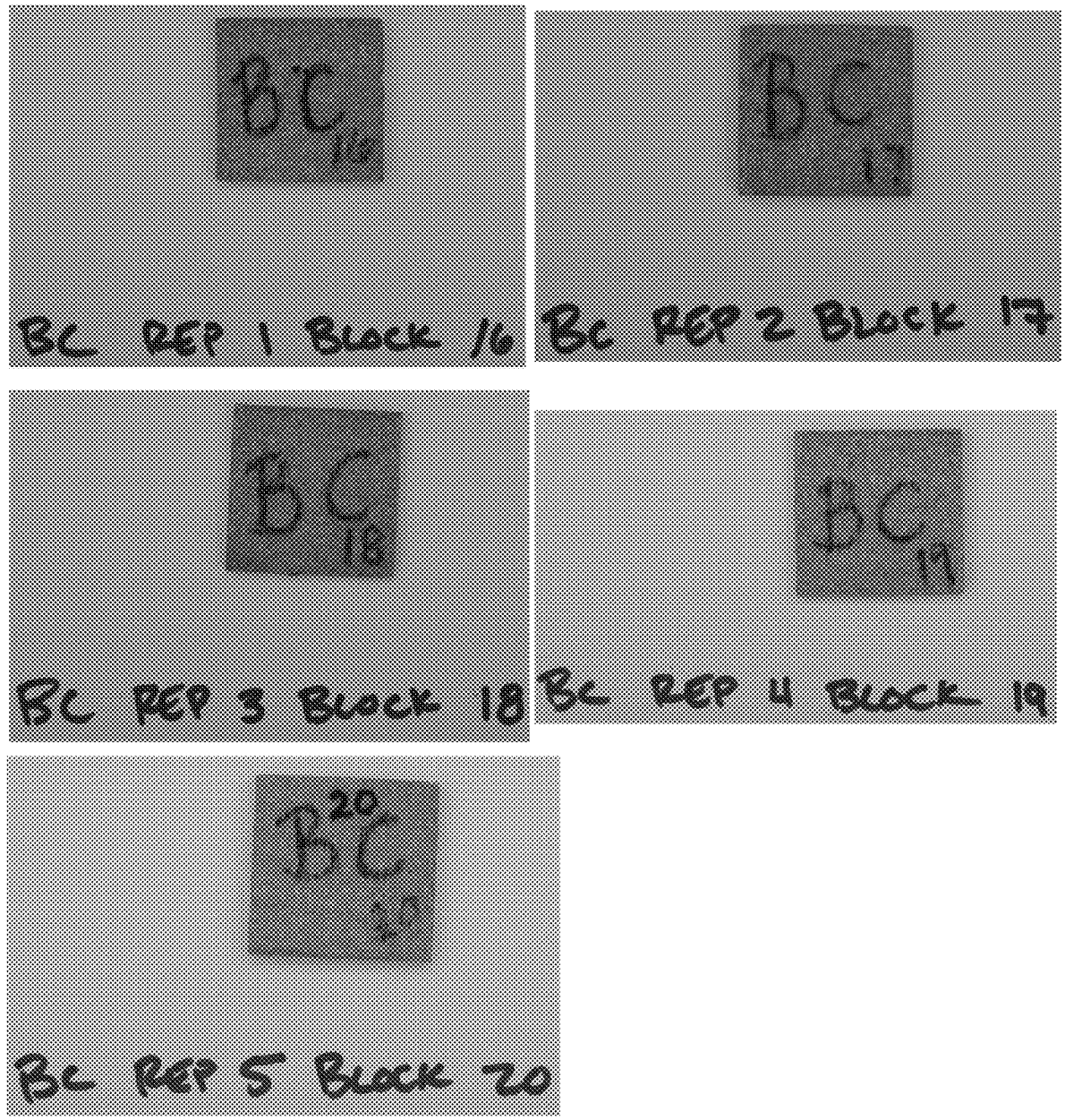
FIG. 8 is a photograph showing a series of wood blocks treated with conventional compositions, for comparison to exemplary compositions described herein in accordance with embodiments of the invention, to evaluate and compare the effectiveness of such respective compositions.
Figure 9:
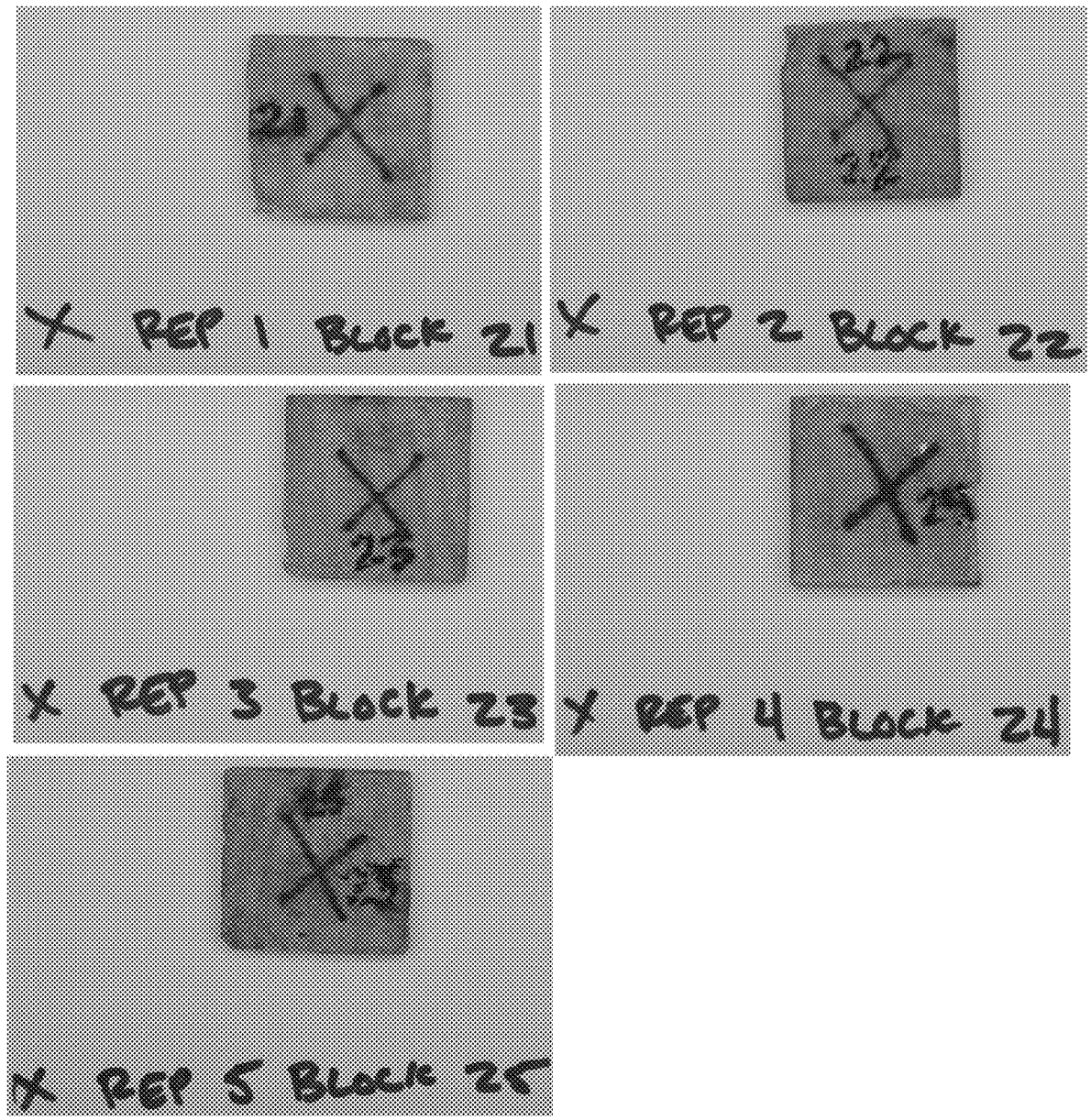
FIG. 9 is a photograph showing a series of wood blocks treated with exemplary compositions described herein in accordance with embodiments of the invention to evaluate the effectiveness of such compositions.

FIG. 5 illustrates a photograph of the control, untreated wood block samples after the experiment, wherein the termites consumed on average 51.24% of the wood blocks, by weight. As seen in FIG. 6, which illustrates a photograph of the wood samples treated with Treatment Y, in accordance with embodiments of the invention, after the experiment, wherein the termites only consumed on average 4.762% of the wood blocks, by weight. As seen in FIG. 7, which illustrates a photograph of the wood samples treated with Treatment B, in accordance with embodiments of the invention, after the experiment, wherein the termites only consumed on average 3.754% of the wood blocks, by weight. As seen in FIG. 8, which illustrates a photograph of the wood samples treated with Treatment BC after the experiment, wherein the termites consumed on average 21.916% of the wood blocks, by weight. As seen in FIG. 9, which illustrates a photograph of the wood samples treated with Treatment X, in accordance with embodiments of the invention, after the experiment, wherein the termites only consumed on average 6.312% of the wood blocks, by weight.

Figure 10:
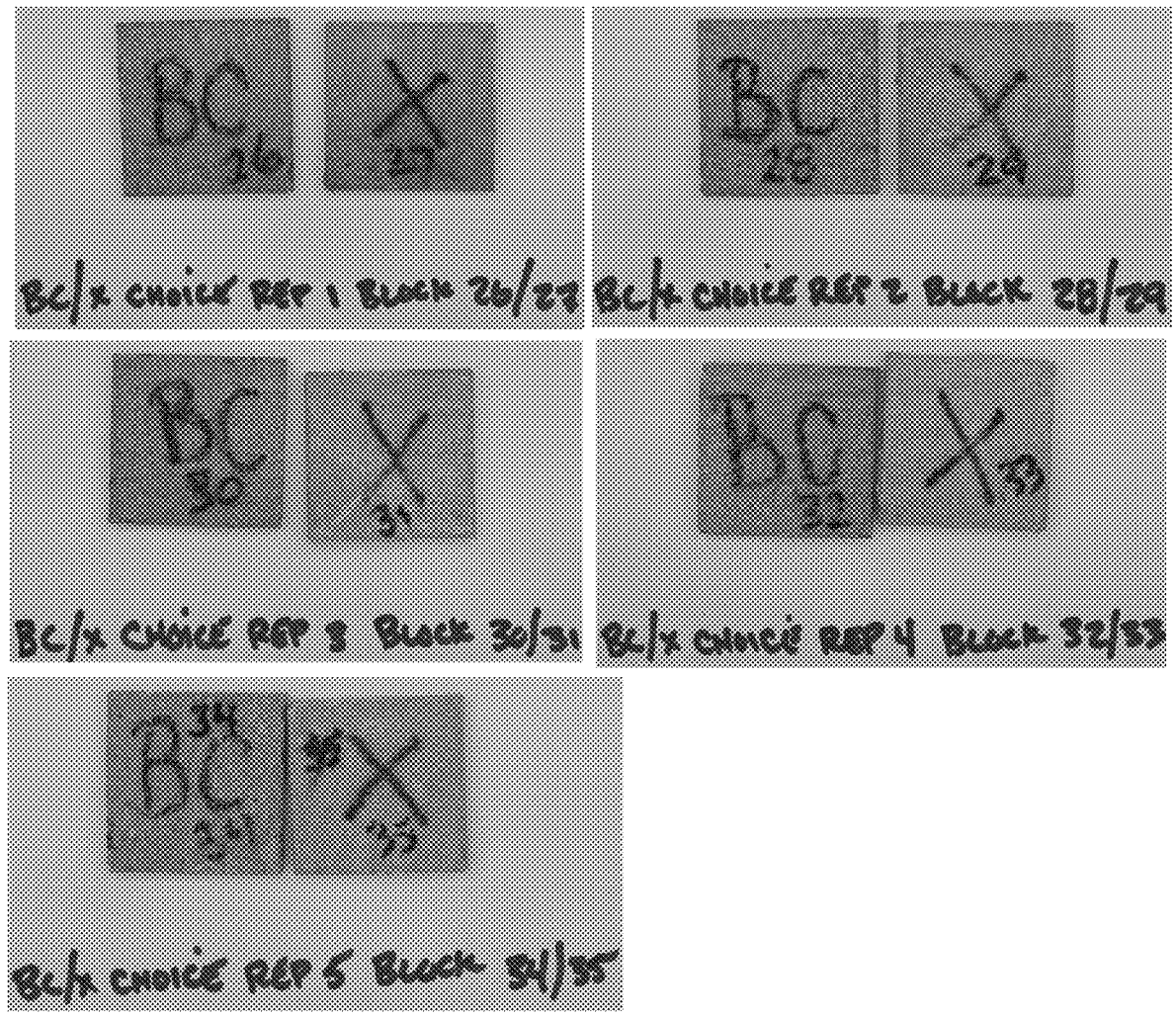
FIG. 10 a photograph showing a series of sets of wood blocks treated with conventional compositions and wood blocks treated with compositions described herein in accordance with embodiments of the invention, to evaluate and compare the effectiveness of such respective compositions.

As seen in FIG. 10, which illustrates a photograph of the two choice tests, comparing wood block samples treated with Treatment BC and wood block samples treated with Treatment X, in accordance with embodiments of the invention, after the experiment. Therefore, the experiment revealed that for the two choice tests, there was a significant difference between wood consumption ($t=2.612$, $df=2$, $P=0.031$). Termites consumed significantly more wood treated with Treatment BC than wood treated with Treatment X.

As seen in Table 3 above, the effectiveness of Treatment BC (consisting of the conventional termiticide BORA-CARE®) at repelling termites and preventing said termites from consuming the wood blocks is significantly less effective than treatments utilizing embodiments of the present invention.

Table 4 illustrates the test jar weights taken throughout the study and the numbers of live termites in each jar at the beginning of the study and at the end of the study.

TABLE 4

Test Jar Weights Throughout Study and Numbers of Live Termites at the Beginning and End of the Study

| Project #: D'Amico | | NOMTCB Entomology Lab | | | JULY | | 2019 | | | SOP 440 Form B Termite Test Assemblies |
|---|---|---|---|---|---|---|---|---|---|---|
| Assembly Date: Jul. 17, 2019 | Time: 9 AM | No Choice Test | | Choice Test | Assembled by: Guidry | | Recorded by: Guidry | | | |
| Environmental Chamber: | | WPG 203 | T (° C.): | 28 | % RH: 80 | Balance: Guidry | WPG 202 | Hygrometer: | WPG ZZZ | Data Logger: | WPG YYY |
| Container Size: | 8 oz | Measured by: | | | | | | | | |

| Test Assemblies | | | | | | Weight (g) | | | | | Final Live Termite | | |
|---|---|---|---|---|---|---|---|---|---|---|---|---|---|
| Container | Block | Initial Termite Count | | | | Initial | Jul. 24, | Jul. 31, | Aug. 7, | Aug. 14, | | | |
| No. | No(s). | Worker | Soldier | Total | Sand | Assembly | 2019 | 2019 | 2019 | 2019 | Worker | Soldier | Total |
| 1 | 1 | 360 | 40 | 400 | 150 | 404.8 | 404.2 | 403.2 | 402.3 | 401.7 | 272 | 21 | 293 |
| 2 | 2 | 360 | 40 | 400 | 150 | 403.4 | 402.7 | 401.7 | 400.6 | 399.5 | 263 | 31 | 294 |
| 3 | 3 | 360 | 40 | 400 | 150 | 405.8 | 405.1 | 404.1 | 403.0 | 402.0 | 261 | 25 | 286 |
| 4 | 4 | 360 | 40 | 400 | 150 | 402.1 | 401.7 | 400.7 | 400.2 | 398.9 | 332 | 31 | 363 |
| 5 | 5 | 360 | 40 | 400 | 150 | 406.0 | 405.5 | 401.3 | 395.8* | 396.9 | 121 | 11 | 132 |
| 6 | 6 | 360 | 40 | 400 | 150 | 406.4 | 406.0 | 405.3 | 404.6 | 403.7 | 0 | 0 | 0 |
| 7 | 7 | 360 | 40 | 400 | 150 | 409.9 | 409.7 | 408.9 | 408.2 | 407.4 | 0 | 0 | 0 |
| 8 | 8 | 360 | 40 | 400 | 150 | 406.7 | 406.1 | 405.3 | 404.3 | 403.4 | 0 | 0 | 0 |
| 9 | 9 | 360 | 40 | 400 | 150 | 406.2 | 405.7 | 404.8 | 404.1 | 403.3 | 0 | 0 | 0 |
| 10 | 10 | 360 | 40 | 400 | 150 | 411.7 | 411.3 | 410.6 | 409.9 | 409.2 | 8 | 0 | 8 |
| 11 | 11 | 360 | 40 | 400 | 150 | 406.2 | 405.7 | 404.9 | 404.1 | 403.3 | 0 | 0 | 0 |
| 12 | 12 | 360 | 40 | 400 | 150 | 405.6 | 405.2 | 404.3 | 403.5 | 402.7 | 0 | 0 | 0 |
| 13 | 13 | 360 | 40 | 400 | 150 | 411.2 | 410.8 | 410.1 | 409.5 | 408.9 | 0 | 0 | 0 |
| 14 | 14 | 360 | 40 | 400 | 150 | 411.1 | 410.8 | 410.1 | 409.6 | 409.0 | 0 | 0 | 0 |
| 15 | 15 | 360 | 40 | 400 | 150 | 406.4 | 405.6 | 404.8 | 403.9 | 402.7 | 0 | 0 | 0 |
| 16 | 16 | 360 | 40 | 400 | 150 | 407.6 | 407.3 | 406.7 | 406.0 | 405.3 | 0 | 0 | 0 |
| 17 | 17 | 360 | 40 | 400 | 150 | 412.9 | 412.6 | 412.1 | 411.5 | 410.8 | 0 | 0 | 0 |
| 18 | 18 | 360 | 40 | 400 | 150 | 408.2 | 407.7 | 407.1 | 406.4 | 405.8 | 0 | 0 | 0 |
| 19 | 19 | 360 | 40 | 400 | 150 | 413.3 | 412.9 | 412.3 | 411.6 | 411.0 | 0 | 0 | 0 |
| 20 | 20 | 360 | 40 | 400 | 150 | 408.8 | 408.6 | 408.3 | 408.0 | 407.7 | 0 | 0 | 0 |
| 21 | 21 | 360 | 40 | 400 | 150 | 399.6 | 399.1 | 398.6 | 397.9 | 397.2 | 99 | 13 | 112 |
| 22 | 22 | 360 | 40 | 400 | 150 | 407.2 | 406.8 | 406.1 | 405.3 | 404.6 | 0 | 0 | 0 |
| 23 | 23 | 360 | 40 | 400 | 1540 | 407.4 | 406.7 | 405.9 | 405.2 | 404.3 | 29 | 8 | 37 |
| 24 | 24 | 360 | 40 | 400 | 150 | 412.3 | 411.5 | 410.5 | 409.5 | 408.7 | 170 | 19 | 189 |
| 25 | 25 | 360 | 40 | 400 | 150 | 405.9 | 405.3 | 404.6 | 403.8 | 403.0 | 11 | 3 | 14 |
| 26 | 26 27 | 360 | 40 | 400 | 150 | 411.6 | 411.3 | 410.7 | 409.9 | 409.3 | 0 | 0 | 0 |
| 27 | 28 29 | 360 | 40 | 400 | 150 | 410.4 | 410.2 | 409.7 | 409.2 | 408.7 | 0 | 0 | 0 |
| 28 | 30 31 | 360 | 40 | 400 | 150 | 412.0 | 411.7 | 411.2 | 410.6 | 410.2 | 0 | 0 | 0 |
| 29 | 32 33 | 360 | 40 | 400 | 150 | 413.2 | 412.9 | 411.9 | 411.0 | 410.3 | 0 | 0 | 0 |
| 30 | 34 35 | 360 | 40 | 400 | 150 | 411.8 | 411.8 | 411.4 | 410.8 | 410.3 | 0 | 0 | 0 |
| 31 | | 360 | 40 | 400 | 150 | 402.0 | 401.4 | | | | 282 | 7 | 289 |
| 32 | | 360 | 40 | 400 | 150 | 404.9 | 404.9 | | | | 302 | 7 | 309 |
| 33 | | 360 | 40 | 400 | 150 | 404.6 | 404.3 | | | | 313 | 2 | 315 |
| 34 | | 360 | 40 | 400 | 150 | 398.9 | 398.6 | | | | 299 | 12 | 311 |
| 35 | | 360 | 40 | 400 | 150 | 401.4 | 401.0 | | | | 271 | 14 | 285 |

The experiment revealed that there was a significant difference in termite mortality among treatments (P<0.001). Analysis of variance (ANOVA) was performed following a Tukey Test to rank treatments, as illustrated in Table 5, which utilized pairwise multiple comparisons between treatments. The treatments tested in this experiment which are ranked with the same letter showed no significant differences in termite mortality.

TABLE 5

| Treatment | Average Mortality | Percentage (%) | Ranking |
| --- | --- | --- | --- |
| Control (no treatment) | 126.4 | 31.6% | A |
| Termites only (no wood, after one week) | 98.2 | 24.6% | A |
| Y | 398.4 | 99.6% | B |
| X | 329.6 | 82.4% | B |
| B | 400 | 100% | B |
| BC | 400 | 100% | B |

This experiment indicated that the compositions of the present invention are effective at repelling and killing termites from treated wood samples. The compositions, in accordance with embodiments of the present invention, are significantly more effective at repelling termites and nearly or just as effective at killing termites as compared to conventional termiticides.

As seen in the data set forth in Example 1 and Example 2 above, the embodiments of the present invention identified herein offer a safe and effective method for controlling termite infestations. Further, the treatment processes described herein provide effective use as termite repellents, termiticides, and wood preservatives. The treatment processes may also be used with effectiveness for protection from other wood boring insects.

To the extent there may be perceived health or environmental concerns with existing termite repellents, termiticides, and wood preservatives, the ability to replace or reduce the amount of toxic termiticides and toxic wood preservatives by use of the present invention offers additional benefits as well. The non-toxic nature of the present invention makes embodiments of the invention ideal candidates for preventing, and treating termite infestations in both household and commercial settings.

The compositions of the present invention can be utilized on wooden surfaces, preferably unfinished or properly prepared and sanded previously finished wooden surfaces. All surfaces should preferably be clean and free from dirt, dust, grease, wax oil, silicone, tsp/soap, mill scale, oxidation, loose peeling paint or varnish, or any foreign matter/contaminants. The compositions of the present invention should be applied where there is adequate ventilation.

The compositions of the present invention may cause mild irritation to the eyes, skin, and respiratory tract. Therefore, users are advised to use the correct personal protective equipment (PPE) when handling the compositions of the present invention.

Referring to the following methods, after wood is treated with one or more of the compositions disclosed herein in accordance with embodiments of the invention, the treated wood is preferably dried in an arid environment with little to no humidity. One skilled in the art can appreciate that increased levels of humidity would cause an increase in the amount of time required for the treated wood to completely dry.

In accordance with embodiments of the invention, there is provided a preferred method of treating wood for use in interior and exterior settings with an insect repelling composition. In such embodiment, before applying the insect repelling composition to wood, a user should mix the composition thoroughly, preferably by gently stirring the composition, or by rolling a container housing said composition, in an effort to avoid air bubbles. Preferably, the composition should be stirred thoroughly for approximately minutes prior to application. The preferred method comprises applying the insect control composition to at least one wood surface of a piece of wood by painting the composition onto the at least one wood surface, for example, with a quality nylon brush or pad applicator. In such preferred embodiment, the user uses the brush or pad to apply liberal coats of the composition to the at least one wood surface, while avoiding over brushing and keeping the brush or pad saturated with the composition. Preferably, the user applies a first coat of the composition to the at least one wood surface to a point of surface saturation. Then, the method preferably includes waiting approximately 6-24 hours to allow the composition of the first coat to completely dry. Once the composition applied to the at least one wood surface is substantially or completely dry, the user applies a second coat of the composition to the at least one wood surface to a point of surface saturation. The method further includes waiting an additional approximately 6-24 hours to allow the composition of the second coat to completely dry.

In one embodiment, the user adds water the composition to achieve desired consistency before applying the first coat.

In another preferred embodiment, there is provided a method of treating a piece of lumber with a wood preserving insect repelling composition. In one embodiment, for example, a preferred wood preserving insect repelling composition comprises 25% cold pressed orange oil having a D-Limonene concentration of at least 80% (and more preferably of at least 90%, and most preferably of at least 95%) and 75% acrylic lacquer. In a preferred embodiment, the acrylic lacquer comprises approximately 45% by weight modified acrylic emulsion copolymer, at least 40% by weight water, at least 5% by weight dipropylene glycol methyl ether, at least less than 5% by weight polysiloxane polymer, and at least less than 5% by weight amine solution, The method includes a step of first dipping the piece of lumber into cold pressed orange oil having a D-Limonene concentration of at least 80% and preferably leaving the piece of lumber in the cold pressed orange oil for at least 24 hours, until the piece of lumber is completely saturated with the cold pressed orange oil. The preferred method then includes a preferred step of placing the piece of lumber in a dryer to dry out the piece of lumber. Once the piece of lumber is substantially or completely dried out, the method preferably includes a step of applying a first coat of the wood preserving insect repelling composition to at least one surface of the piece of lumber to a point of surface saturation by painting said at least one surface with a brush or pad, applying liberal coats of the composition to the at least one surface, while avoiding over brushing and keeping the brush or pad saturated with the composition. Preferably, the piece of lumber is completely dry prior to the step of applying the first coat of the composition to treat the piece of lumber. In such manner, it is believed that allowing the piece of lumber to completely dry prior to the application of the composition provides improved penetration of the composition into cells of the piece of lumber. Post preferably, the piece of lumber saturated with the cold pressed orange oil is allowed to dry in a non-humid environment.

In one embodiment, the method includes a step of waiting until the first coat is completely dry before applying a second coat of the composition. The method further includes a step of applying the second coat of the wood preserving insect repelling composition to the at least one surface of the piece of lumber to a point of surface saturation by painting the at least one surface with the brush or pad, applying liberal coats of the composition to the at least one surface, while avoiding over brushing and keeping the brush or pad saturated with the composition.

In another embodiment, the method further includes a step of waiting until the second coat is completely dry before handling the treated wood.

In yet another embodiment, the wood preserving insect repelling composition includes at least 75% commercial wood preservative and at least 25% cold pressed orange oil having a D-Limonene concentration of at least 80% (and more preferably of at least 90%, and most preferably of at least 95%), to cause said composition to bond properly to the at least one surface of the piece of lumber and to keep in the scent of the D-Limonene active for an extended period of time.

In another embodiment, the user can add water the composition to achieve desired consistency before applying the first coat.

In another preferred embodiment, there is provided a method of treating wood for use in interior and exterior settings with an insect repelling composition. In such embodiment, before applying the insect repelling composition to wood, a user should mix the composition thoroughly, preferably by gently stirring the composition, or by rolling a container housing said composition, in an effort to avoid air bubbles. Preferably, the composition should be stirred thoroughly for approximately 20 minutes prior to application. The preferred method comprises applying said insect control composition to at least one wood surface by spraying the composition onto said wood surface with an unheated spray applicator. The user applies a first coat of the composition to the at least one wood surface to a point of surface saturation. The method includes waiting approximately 6 to 24 hours to allow the composition of the first coat to completely dry. Once the composition applied to the at least one wood surface is completely dry, the user applies a second coat of the composition to the at least one wood surface to a point of surface saturation. The method further includes waiting an additional approximately 6 to 24 hours to allow the composition of the second coat to completely dry.

In yet another preferred embodiment, there is provided a method of pre-treating wood for use in interior and exterior settings with an insect repelling composition. In such preferred embodiment, before pre-treating the wood with the composition, a user should mix the composition thoroughly by gently stirring or rolling a container housing said composition to avoid air bubbles. In such preferred embodiment, the method includes applying a first coat of the insect repelling composition to pretreat a piece of wood by soaking the piece of wood with said insect repelling composition to a point of wood saturation. A user pre-treating the piece of wood removes the piece of wood at the point of wood saturation from the container housing the composition. The method includes allowing the piece of wood at the point of wood saturation with the composition to dry for approximately 8 to 24 hours before handling the piece of wood.

In one embodiment, the method further includes applying a second coat of the insect repelling composition to the piece of wood after the piece of wood at the point of wood saturation with the composition has dried for approximately 8-24 hours by soaking said piece of wood in the composition to the point of wood saturation and allowing the piece of wood to dry for an additional approximately 8 to 24 hours before handling said piece of wood.

In another embodiment, the user can add water the composition to achieve desired consistency before applying the first coat.

In another preferred embodiment, there is provided a method of treating wood with an insect repelling composition for use in interior and exterior settings. The method includes a step of first dipping the piece of wood in cold pressed orange oil, a second step of leaving the piece of wood in the cold pressed orange oil for approximately 24 hours, a third step of letting the piece of wood dry for approximately 24 hours. Once the piece of wood is dry, the method includes a step of applying a first coat of the insect repelling composition to the piece of wood to a point of surface saturation by dipping and soaking the piece of wood with said insect repelling composition. The method preferably includes a step of waiting at least 24 hours until the first coat is completely dry before applying a second coat. The method includes a step of applying the second coat of the insect repelling composition to the at least one wood surface to a point of surface saturation by dipping and soaking the piece of wood with said insect repelling composition and a step of waiting until the second coat is completely dry before handling the treated wood.

In one embodiment, an insect repelling composition disclosed herein includes at least 70% commercial wood preservative and at least 30% cold pressed orange oil having a D-Limonene concentration of at least 80% to cause said composition to bond properly to the piece of wood and to keep in the scent of the D-Limonene.

In another embodiment, the user can add water to the composition to achieve desired consistency before applying the first coat.

Under normal conditions, the compositions of the present invention dry to the touch in at least one hour and are recoatable after approximately 6 to 24 hours. The composition will continue to cure and become harder over time. Normal conditions preferably include a dry surface, access to fresh airflow, moderate humidity, and temperatures around 70 degrees Fahrenheit. Thick application, high humidity, or conditions other than normal will cause these compositions to dry and cure more slowly. It is advisable to avoid freezing temperatures when applying the compositions of the present invention.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

All measurements disclosed herein are at standard temperature and pressure, at sea level on Earth, unless indicated otherwise.

In the specification and the claims, an "effective amount" of D-Limonene is an amount that, when applied to a substrate or other material, causes significant repellence or toxicity, or that decreases the activity or viability of termites as compared to an otherwise identical environment without the added extract.

In the specification and the claims, an "effective amount" of acrylic lacquer and cold pressed orange oil, having a D-Limonene concentration of at least 80%, is an amount that, when applied to a substrate or other material, causes significant repellence or toxicity, or that decreases the activity or viability of termites as compared to an otherwise identical environment without the added extract.

In the specification and the claims, a "pesticidally-effective amount" of a composition comprising an active ingredient and a pesticidally-acceptable carrier, wherein the active ingredient is cold pressed orange oil containing a D-Limonene concentration of at least 80%, wherein the pesticidally-acceptable carrier is an acrylic lacquer, is an amount that, when applied to a substrate or other material, causes significant repellence or toxicity, or that decreases the activity or viability of termites as compared to an otherwise identical environment without the added extract.

The foregoing embodiments are presented by way of example only. This invention is susceptible to considerable variation within the spirit and scope of the appended claims.

All U.S. patents and publications identified herein are incorporated in their entirety by reference thereto.

The invention claimed is:

1. A composition to control insects consisting of:
   25% by weight of cold pressed orange oil containing a D-Limonene concentration of at least 80%; and
   75% by weight of an acrylic lacquer.

2. The composition to control insects of claim 1 wherein the 25% by weight cold pressed orange oil contains a D-Limonene concentration of at least 90%.

3. The composition to control insects of claim 1 wherein the 25% by weight cold pressed orange oil contains a D-Limonene concentration of at least 95%.

4. A composition to control insects consisting of:
   20% by weight of cold pressed orange oil containing a D-Limonene concentration of at least 80%; and
   80% by weight of an acrylic lacquer.

5. The composition to control insects of claim 4, wherein the 20% by weight cold pressed orange oil contains a D-Limonene concentration of at least 90%.

6. The composition to control insects of claim 4, wherein the 20% by weight cold pressed orange oil contains a D-Limonene concentration of at least 95%.

7. A composition to control insects consisting of:
   20% by weight of cold pressed orange oil containing a D-Limonene concentration of at least 80%;
   50% by weight of an acrylic lacquer;
   20% by weight of boric acid; and
   10% by weight of water.

8. The composition to control insects of claim 7, wherein the 20% by weight cold pressed orange oil contains a D-Limonene concentration of at least 90%.

9. The composition to control insects of claim 7, wherein the 20% by weight cold pressed orange oil contains a D-Limonene concentration of at least 95%.

10. A composition to control insects consisting of:
    20% by weight of cold pressed orange oil containing a D-Limonene concentration of at least 80%;
    50% by weight of an acrylic lacquer, wherein said 50% by weight of the acrylic lacquer consists of:
      45% by weight of a modified acrylic emulsion copolymer,
      3% by weight of dipropylene glycol methyl ether,
      1% by weight polysiloxane polymer, and
      2% by weight amine solution;
    20% by weight of boric acid; and
    10% by weight of water.

11. The composition to control insects of claim 10, wherein the 20% by weight cold pressed orange oil contains a D-Limonene concentration of at least 90%.

12. The composition to control insects of claim 10, wherein the 20% by weight cold pressed orange oil contains a D-Limonene concentration of at least 95%.

* * * * *